US010641585B2

(12) United States Patent
Hershey et al.

(10) Patent No.: US 10,641,585 B2
(45) Date of Patent: May 5, 2020

(54) SYSTEM AND METHOD FOR INTEGRATED AND SYNCHRONIZED PLANNING AND RESPONSE TO DEFEAT DISPARATE THREATS OVER THE THREAT KILL CHAIN WITH COMBINED CYBER, ELECTRONIC WARFARE AND KINETIC EFFECTS

(71) Applicant: Raytheon Company, Waltham, MA (US)

(72) Inventors: Paul Christian Hershey, Ashburn, VA (US); Marilyn Winklareth Zett, Vienna, VA (US); Michael Angelo Cianciosi, II, Fairfax, VA (US); Brianne Rene-Martinek Hoppes, Westminster, CO (US); Roland Dige Chang, Fairfax, VA (US); Andrew Arnold, Arlington, VA (US); John Zolper, Jr., Vienna, VA (US)

(73) Assignee: Raytheon Company, Waltham, MA (US)

( * ) Notice: Subject to any disclaimer, the term of this patent is extended or adjusted under 35 U.S.C. 154(b) by 660 days.

(21) Appl. No.: 15/445,095

(22) Filed: Feb. 28, 2017

(65) Prior Publication Data

US 2018/0038669 A1    Feb. 8, 2018

Related U.S. Application Data

(60) Provisional application No. 62/305,151, filed on Mar. 8, 2016.

(51) Int. Cl.
*F41H 11/02*    (2006.01)
*F41H 11/00*    (2006.01)
(Continued)

(52) U.S. Cl.
CPC ............. *F41H 11/02* (2013.01); *F41H 11/00* (2013.01); *G06F 17/18* (2013.01); *G06N 7/005* (2013.01)

(58) Field of Classification Search
CPC .......... F41H 11/02; F41H 11/00; G06F 17/18; G06N 7/005
(Continued)

(56) References Cited

U.S. PATENT DOCUMENTS 6,945,780 B2    9/2005 Perry
9,544,326 B2    1/2017 Hershey
(Continued)

OTHER PUBLICATIONS

The Ballistic Missile Defense System (BMDS), Missile Defense Agency, http://www.mda.mil/system/system.html, accessed Dec. 12, 2013.
(Continued)

*Primary Examiner* — Eunhee Kim
(74) *Attorney, Agent, or Firm* — Eric A. Gifford

(57) ABSTRACT

An automated system and method provides for planning and response to disparate threats with combined kinetic (e.g., missile interceptor) and non-kinetic (e.g., cyber and electronic warfare) effects. The threat and effects inputs and the results of analysis tools that individually apply a single effect type to negate a threat vulnerability are normalized to a form and format ingestible by a Stochastic Math Model (SMM). The normalized inputs reflect the success/failure of the effect versus a threat vulnerability as a score, not a probability. The normalized results decompose a probability of defeat (Pdefeat) for an individual effect as a set of hierarchical parameters represented as probabilities. The SMM and analysis tools are iteratively run on the normalized inputs and results data, including either organically or synthetically injected variability of the data, to compute and visualize a Pdefeat (Continued)

with an associated confidence interval (CI) for each effect and the combined effects at each stage of the threat kill chain.

20 Claims, 26 Drawing Sheets

(51) Int. Cl.
    *G06N 7/00*            (2006.01)
    *G06F 17/18*         (2006.01)

(58) Field of Classification Search
    USPC .............................................................. 703/2
    See application file for complete search history.

(56) References Cited

U.S. PATENT DOCUMENTS

| | | | |
|---|---|---|---|
| 9,779,191 B1 * | 10/2017 | Hershey | G06F 17/5036 |
| 2014/0279809 A1 | 9/2014 | Hershey | |
| 2015/0205760 A1 * | 7/2015 | Hershey | G06N 20/00 |
| | | | 702/181 |
| 2016/0070674 A1 | 3/2016 | Hershey | |
| 2016/0253590 A1 | 9/2016 | Hershey | |

OTHER PUBLICATIONS

Wilkening, D. A., "A Simple Model for Calculating Ballistic Missile Defense Effectiveness," Science & Global Security 1999, vol. 8:2, pp. 183-215.

The Effective Integration of Analysis, Modeling, and Simulation Tools, U.S. Department of Transportation Federal Highway Administration, Publication No. FHWA-HRT-13-036 Date: Aug. 2013.

Ragot et al, "Correlation energy of many-electron systems: a modified Colle-Salvetti approach," Jun. 15, 2006.

Crivellaro Usaf, "Combined Arms in the Electro-Magnetic Spectrum: Integrating Non-Kinetic Operations ," School of Advanced Military Studies United States Army Command and General Staff College Fort Leavenworth, Kansas, May 2013.

Curley et al. "The application of Dempster-Shafer theory demonstrated with justification provided by legal evidence," Department of Information & Decision Science, University of Minnesota, Judgment and Decision Making, vol. 2, No. 5, Oct. 2007, pp. 257-276.

Hershey et al., "Adaptable Mission Analysis and Decision System," Proc. of the 2015 IEEE International Systems of Systems Engineering Conf., San Antonio, TX, May 18, 2015.

Hershey et al., "A Stochastic Math Model for Estimating Ballistic Missile Negation via Left of Launch Techniques," Proc. 82nd MORS (Military Operations Research Society) Symposium, Alexandria, VA, Jun. 17, 2014.

Hershey et al., "Real-time Communications Resource Allocation Process, Architecture, and Algorithm," Proc. of MILCOM 2013, San Diego, CA, Nov. 19, 2013.

Hershey et al., "Probabilistic Multi-source Multi-INT Intel Fusion Benefit Analysis," Proc. SPIE Multisensor, Multisource Information Fusion: Architectures, Algorithms, and Applications May 5, 2014, Baltimore, MD, 2014.

* cited by examiner

Pdefeat = Pdefeat, E1 + ((1 - Pdefeat, E1) * (Pdefeat, E2) | Pdefeat, E1
+ (1 - Pdefeat, E1) (1 - Pdefeat, E2) * (Pdefeat, E3) | Pdefeat, E1, Pdefeat, E2
+ ((1 - Pdefeat, E1) (1 - Pdefeat, E2) (1 - Pdefeat, E3) * (Pdefeat, E4) | Pdefeat, E1, Pdefeat, E2, Pdefeat, E3) ...

FIG. 4a

RED FORCE UI
FILE  HELP

MISSION PLANNING / MISSION MANAGEMENT
- CREATE ATTACK PLAN
- GENERATE SCENARIO
- SCENARIO SELECTION
- VISUALIZE SCENARIO
- PLANNING COMPLETE

UNCLASSIFIED

| STAGE NAME | SUBSTAGE NAME | ACTIVITY START TIME | THREAT/GROUP COUNT |
|---|---|---|---|
| MANUFACTURING | SE/DESIGN | 0.0 | 40.0 |
| MANUFACTURING | SUPPLY CHAIN | 1512.24 | 40.0 |
| MANUFACTURING | MANUFACTURING | 1964.88 | 40.0 |
| MANUFACTURING | QUALITY ASSURANCE | 3618.96 | 40.0 |
| FIELDING AND DEPLOYMENT | MANUF TO FIELD | 4800.0 | 8.0 |
| FIELDING AND DEPLOYMENT | FACILITIES | 4825.06 | 8.0 |
| FIELDING AND DEPLOYMENT | O/M FIELD | 4982.0 | 8.0 |
| FIELDING AND DEPLOYMENT | COMMS/C2-FIELD | 5139.49 | 8.0 |
| FIELDING AND DEPLOYMENT | FIELD TO BOOST | 5520.0 | 40.0 |
| BOOST | COMMS/C2-BOOST | 5772.78 | 40.0 |
| BOOST | FLIGHT-BOOST | 5772.81 | 40.0 |
| MID-COURSE | COMMS/C2-MIDCOURSE | 5772.83 | 40.0 |
| MID-COURSE | FLIGHT-MIDCOURSE | 5772.84 | 40.0 |
| TERMINAL | FLIGHT-TERMINAL | 5772.86 | 40.0 |

FIG.6a

| EFFECT NAME | TECHNIQUE TYPE | STAGE | SUBSTAGE |
|---|---|---|---|
| CALIBRATION | CYBER | MANUFACTURING | MANUFACTURING |
| DENIAL OF SERVICE 1 | CYBER | FIELDING AND DEPLOYM.. | MANUF TO FIELD |
| DENIAL OF SERVICE 2 | CYBER | FIELDING AND DEPLOYM.. | FIELD TO BOOST |
| CYBER GPS | CYBER | BOOST | COMMS/C2-BOOST |
| GMD | KINETIC | MID-COURSE | FLIGHT-MIDCOURSE |
| EXAMPLE EFFECT | KINETIC | TERMINAL | FLIGHT-TERMINAL |

FIG. 6b

| VULN | 1 | 2 | 3 | 4 | 5 |
|---|---|---|---|---|---|
| 1 | AND | | | | |
| 2 | | OR | OR | | |
| 3 | | | | AND | AND |

| | SME GROUP 1 SCORES | SME GROUP 2 SCORES | SME GROUP 3 SCORES | SME GROUP 4 SCORES | SME GROUP 5 SCORES |
|---|---|---|---|---|---|
| P_DEPLOY | 5 | 3 | 5 | 4 | 4 |
| P_ACTIVATE | 4 | 3 | 5 | 4 | 5 |
| P_SUCCESS | 5 | 3 | 4 | 5 | 4 |
| P_SEVERE | 3 | 3 | 5 | 5 | 5 |

FIG. 7c

| KILL CHAIN STAGE | TYPE EFFECT | SME GROUP 1 SCORES | SME GROUP 2 SCORES | SME GROUP 3 SCORES | SME GROUP 4 SCORES | SME GROUP 5 SCORES | SME GROUP 6 SCORES | SME GROUP 7 SCORES |
|---|---|---|---|---|---|---|---|---|
| CALIBRATION | CYBER | 1 | 1 | 3 | 3 | 4 | 3 | 2 |
| CALIBRATION - PART 2 | CYBER | 1 | 3 | 1 | 3 | 4 | 3 | 2 |
| DENIAL OF SERVICE 1 | CYBER | 2 | 2 | 1 | 4 | 3 | 3 | 4 |
| DENIAL OF SERVICE 2 | CYBER | 3 | 2 | 5 | 3 | 3 | 3 | 3 |
| CYBER GPS | CYBER | 4 | 3 | 1 | 4 | 4 | 4 | 5 |
| GMD | KINETIC | 5 | 4 | 2 | 1 | NA | NA | NA |

| THREAT IDENTIFIER | Pdefeat |
|---|---|
| 1 | 0.79 |
| 2 | 0.82 |
| 3 | 0.91 |
| 4 | 0.83 |
| 5 | 0.74 |
| 6 | 0.86 |
| 7 | 0.76 |
| 8 | 0.85 |
| 9 | 0.77 |
| 10 | 0.88 |
| 11 | 0.84 |
| 12 | 0.8 |
| 13 | 0.83 |
| 14 | 0.77 |
| 15 | 0.8 |
| 16 | 0.79 |
| 17 | 0.88 |
| 18 | 0.8 |
| 19 | 0.75 |
| 20 | 0.8 |
| 21 | 0.91 |
| 22 | 0.73 |
| 23 | 0.92 |
| 24 | 0.85 |
| 25 | 0.79 |
| 26 | 0.74 |
| 27 | 0.87 |

FIG.9a

```xml
<?xml version="1.0" encoding="UTF-8" standalone="true"?>
<UserSelectedEffects>
    <EffectDataRow>
        <effectName>Calibration</effectName>
        <techniqueType>Cybe</techniqueType>
        <effectID>1</effectID>
        <layerName>Manufacturing</layerName>
        <subLayerName>Manufacturing</subLayerName>
        <secondLayerName>Bost</secondLayerName>
        <secondSubLayerName>Comms/C2-Boost</secondSubLayerName>
        <layerID>1</layerID>
        <subLayerID>3</subLayerID>
        <secondSubLayerID>1</secondSubLayerID>
        <applicability>OR</applicability>
        <placed>
            <DistributionName>AMD</DistributionName>
            <DistributionID>100</DistributionID>
            <P1>3.0</P1>
            <P2>0.0</P2>
            <P3>0.0</P3>
            <P4>0.0</P4>
        </placed>
        <activated>
            <DistributionName>AMD</DistributionName>
            <DistributionID>100</DistributionID>
            <P1>4.0</P1>
            <P2>0.0</P2>
            <P3>0.0</P3>
            <P4>0.0</P4>
        <activated>
        <success>
            <DistributionName>AMD</DistributionName>
            <DistributionID>100</DistributionID>
            <P1>3.0</P1>
            <P2>0.0</P2>
            <P3>0.0</P3>
            <P4>0.0</P4>
        </success>
        <severe>
            <DistributionName>AMD</DistributionName>
            <DistributionID>100</DistributionID>
            <P1>2.0</P1>
            <P2>0.0</P2>
            <P3>0.0</P3>
            <P4>0.0</P4>
        </severe>
```

FIG.10b

| | LEVEL ID | STD DEV | AVERAGE | PROBABILITY | UPPER BOUND | LOWER BOUND | CI UPPER | CI LOWER |
|---|---|---|---|---|---|---|---|---|
| LEVEL 1; SUBLEVEL 1 | 1 | 1.312758 | 897.84 | 0.9976 | 0.99905862 | 0.99614138 | 0.001459 | 0.001459 |
| LEVEL 2; SUBLEVEL 1 | 2 | 2.346629 | 793.56 | 0.99195 | 0.994883286 | 0.989016714 | 0.002933 | 0.002933 |
| LEVEL 2; SUBLEVEL 2 | 2 | 0.663325 | 99.76 | 0.9976 | 1.00423325 | 0.99096675 | 0.0024 | 0.006633 |
| LEVEL 3; SUBLEVEL 1 | 3 | 6.5 | 358.2 | 0.8955 | 0.91175 | 0.87925 | 0.01625 | 0.01625 |
| LEVEL 3; SUBLEVEL 2 | 3 | 5.560276 | 358 | 0.895 | 0.908900689 | 0.881099311 | 0.013901 | 0.013901 |
| LEVEL 3; SUBLEVEL 3 | 3 | 0 | 0 | 0 | 0 | 0 | 0 | 0 |
| LEVEL 3; SUBLEVEL 4 | 3 | 0 | 0 | 0 | 0 | 0 | 0 | 0 |
| LEVEL 4; SUBLEVEL 1 | 4 | 7.112196 | 241.8 | 0.806 | 0.829770732 | 0.78229268 | 0.023707 | 0.023707 |
| LEVEL 4; SUBLEVEL 2 | 4 | 3.315117 | 89.64 | 0.8964 | 0.929551169 | 0.863248831 | 0.033151 | 0.033151 |
| LEVEL 4; SUBLEVEL 3 | 4 | 5.85178 | 243.08 | 0.81026667 | 0.829772601 | 0.790760732 | 0.019506 | 0.019506 |
| LEVEL 4; SUBLEVEL 4 | 4 | 3.328163 | 89.08 | 0.8908 | 0.924081627 | 0.857518373 | 0.033282 | 0.033282 |
| LEVEL 5; SUBLEVEL 1 | 5 | 6.487938 | 121.52 | 0.6076 | 0.640039688 | 0.575160312 | 0.03244 | 0.03244 |
| LEVEL 5; SUBLEVEL 2 | 5 | 3.937004 | 80 | 0.8 | 0.839370039 | 0.760629961 | 0.03937 | 0.03937 |
| LEVEL 5; SUBLEVEL 3 | 5 | 6.116916 | 121.8 | 0.609 | 0.639584582 | 0.578415418 | 0.030585 | 0.030585 |

FIG. 11B

SYSTEM AND METHOD FOR INTEGRATED AND SYNCHRONIZED PLANNING AND RESPONSE TO DEFEAT DISPARATE THREATS OVER THE THREAT KILL CHAIN WITH COMBINED CYBER, ELECTRONIC WARFARE AND KINETIC EFFECTS

CROSS-REFERENCE TO RELATED APPLICATIONS

This application claims benefit of priority under 35 U.S.C. 119(e) to U.S. Provisional Application No. 62/305,151 entitled "Method and Technique for Simulation and Integration of Multi-Domain Non-kinetic/Kinetic Systems (MAT-SIMS)" and filed on Mar. 8, 2016, the entire contents of which are incorporated by reference.

BACKGROUND OF THE INVENTION

Field of the Invention

This invention relates to systems and methods for planning and responding to defeat disparate threats over the threat kill chain with combined cyber, electronic warfare (EW) and kinetic effects.

Description of the Related Art

Missile defense has evolved from predominantly passive defense used during World War II to the present day kinetic kill solution. Kinetic techniques involve projectile weapons (e.g., such as guns, missiles and bombs) that destroy targets by kinetic effects (e.g., overpressure, projectile, shrapnel and spalling damage, and incendiary effects). Kinetic weapons use stored chemical energy in propellants and warhead explosives and deliver this energy to a target by means of a projectile of some kind. The Joint Munitions Effectiveness Manual (JMEM) is a training manual that provides "guidance" as to the joint effectiveness of different kinetic effects against a certain target.

Continued proliferation of long-range missiles and the fielding of sophisticated threats, such as the maneuvering re-entry vehicle, pose challenges for the fielded Ballistic Missile Defense System (BMDS) weapon systems. However, as missile defense has evolved from World War II to the present day, the advent of the digital age and the emergence of a wide variety of non-kinetic techniques create Asymmetric opportunities to augment the BMDS to negate ballistic missile threats.

Current missile defense strategies out to 2030 wait until the threat launches then limit themselves to a small suite of sensors and only kinetic weapons, significantly limiting their ability to counter raids and complex threats. Further, they are practically defenseless against complex cyber-attacks including insider threats.

A critical component of prior missile defense strategy is the value of deterrence. For example, cannon fired nuclear weapons were a viable deterrent in the Cold War era. Artillery officers were not instructed on the detailed secrets of how to build a tactical nuclear weapon; instead they learned the effects and incorporated them into tactic nuclear doctrine. Like tactical nuclear weapons in the 60s, war fighters need to understand and integrate asymmetric effects into the BMDS to optimize the full potential of all defense layers.

The Department of Defense has acquired and developed a variety of sensors (mostly radars), kinetic interceptors and integrated them into a global ballistic missile defense system. Current missile defense architectures incorporate a layered defense strategy typically with three layers: boost, midcourse and terminal phases. The vast majority of the US investment has been negating threats in the midcourse phase. This is an amazing accomplishment and continues to provide incredible value in defense to the US and its allies. However, as discussed earlier, the rapid proliferation of large number of ballistic missiles and sophisticated threats continue to challenge the BMDS.

Over the last three years, over 50 trans-Atlantic companies participated in the NATO Industry Advisory Group (NIAG) missile defense study. The purpose of the study was to identify anticipated missile defense capabilities from 2020 to 2030. The focus of the NATO study is a continuation of kinetic solutions, which already struggle with raid size and sophistication. In effect, what the 50 trans-Atlantic NATO companies are saying is the best that industry can their offer their democracies through 2030 is to wait for the threats to launch before acting.

Now, with the coming of the digital age, there are a wide variety of non-kinetic techniques being evaluated. Non-kinetic techniques involve nonlethal weapons that do not induce direct physical harm to people. Examples: cyber, directed energy (DE), analogue-to-digital (A-to-D), electronic warfare (EW), decoys. Cyber weapons are delivered digitally. DE weapons deliver a large amount of stored energy from the weapon to the target, to produce structural and incendiary damage effects.

However, major barriers to effectively utilize the kinetic and non-kinetic techniques in a composite manner include the need for: 1) understanding and trust of probabilities of defeat of non-kinetic effects; 2) timely/actionable information; 3) mature planning tools to model the blended kinetic/non-kinetic effects for each warfighter function (e.g. planning, situational awareness, etc.) during each threat phase of the battle speeds across the span of Command and Control, Battle Management and Communications (C2BMC) augmenting solutions (e.g. sensors and shooters); 4) a flexible framework to incorporate existing models, algorithms, data, and effects; and 5) a kinetic versus non-kinetic trade-off assessment on feasibility to accomplish mission objectives and total cost benefit/impact. This creates opportunities to augment the BMDS to assist in negation of ballistic and other missile threats.

Today's BMDS coordinates C2BMC, Sensor and Kinetic Weapon Element operations to achieve integrated capabilities beyond each individual Element's autonomous capabilities. Per MDA, "C2BMC is the force multiplier that globally and regionally networks, integrates, and synchronizes autonomous sensor and weapon systems and operations to optimize performance. C2BMC is an integral part of all system ground and flight tests which verify and exercise all current and future BMDS capabilities." [Reference: Missile Defense Agency Fact Sheet, "Command and Control, Battle Management, and Communications," http://www.m-da.mil, mda.info@mda.mil, 14-MDA-7921 (23 Jul. 14)].

Over the past 20 years digital technologies have matured to the point where virtually all advanced threat's architectures are digitally-based. Further, a full range of non-kinetics techniques—especially cyber have developed to the point where covert techniques can be successfully employed to model, discover and negate threats during and left of launch. Non-kinetic techniques provide a new option for missile defense: covert preemptive threat and non-kinetic in-flight negation. As in the 70s, the maturation of kinetic sensors and interceptors enabled the current layered BMDS, so too now the birth of the digital age and the maturation of non-kinetic techniques can enable the addition of an Asymmetric Missile Defense layer to negate large raids and complex threats. To be clear though, the kinetic and asymmetric BMDS layers both required to achieve high probability of kill and are therefore, complementary not competitive.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The multitude of threats and effects and existing analysis tools have widely disparate data formats that make automating the JMEM to integrate and synchronize a response that combines kinetic and non-kinetic affects against a threat kill chain in anything other than a one-off system impractical. Currently, no system or method exists to run a combined kinetic and non-kinetic effects scenario against a threat kill chain for one or more threats to generate a top-level and hierarchically decomposed probability of defeat (Pdefeat) for the individual and combined effects with confidence intervals with the flexibility to be reconfigured against disparate threats with different combinations of effects.

The present invention provides embodiments of an automated system and method for planning and responding to disparate threats with combined kinetic and non-kinetic (e.g. cyber and electronic warfare) effects. The threat and effects inputs (e.g., physical data, simulated data, sensor data, subject matter expert inputs) and the results of analysis tools that individually apply a single effect type to negate a threat vulnerability are normalized to a form and format (e.g. a delimited file format) ingestible by a Stochastic Math Model (SMM). The normalized inputs reflect the success/failure of the effect versus a threat vulnerability as a score, not a probability. The normalized results decompose a probability of defeat (Pdefeat) for an individual effect as a set of hierarchical parameters represented as probabilities. The SMM is iteratively run on the normalized inputs and results data, including either organically or synthetically injected variability of the data, to compute and visualize a Pdefeat with an associated confidence interval (CI) for each effect and the combined effects at each stage of the threat kill chain.

In an alternate system and method, the SMM ingests only normalized results data from the analysis tools. The input data is provided to the analysis tools but is not normalized and input to the SMM.

In an embodiment, each effect is paired with a threat vulnerability in the threat kill chain either manually or autonomously.

In an embodiment, one or more constraints selected from a policy on the use of effects, effect cost, effect availability and an effect threat readiness level (TRL) are generated for the candidate scenario. The constraints may be used to either pre-screen scenarios prior to modeling or to visualize the constraints with the probabilities for the scenario to facilitate user evaluation and selection.

In an embodiment, a scenario is generated for an active threat by selecting multiple existing scenarios modeled for similar threats and synthesizing the scenarios based on metadata for the active threat and existing scenarios.

In an embodiment, rules-based modules are configured to normalize the threat and effect input data to a delimited file format and the results data to a set of hierarchical parameters in a delimited file format.

In an embodiment, each of the hierarchical parameters is represented by a probability.

In an embodiment, a discrete event simulator (DES) is configured to implement the SMM and perform a Monte Carlo simulation on the organically or synthetically varied input and results data to generate the Pdefeat and confidence intervals.

In an embodiment, the Pdefeat for the combined effects is given by a general equation: Pdefeat=Pdefeat,E1+((1−Pdefeat,E1)*Pdefeat,E2)|Pdefeat,E1+(1−Pdefeat,E1) (1−Pdefeat,E2)*(Pdefeat,E3)|Pdefeat,E1, Pdefeat,E2+(1−Pdefeat, E1) (1−Pdefeat,E2) (1−Pdefeat,E3)*(Pdefeat,E4) Pdefeat, E1, Pdefeat,E2, Pdefeat,E3) . . . where the proabilities of defeat of the individual events may or may not be correlated.

In another embodiment, the Pdefeat is given by an equation in which cyber, electronic warfare and kinetic effects are applied in order "left of launch" and "right of launch" and uncorrelated: Pdefeat=Pdefeat, cyber+(1−Pdefeat,cyber) *Pdefeat, EW+(1−Pdefeat, cyber)*(1−Pdefeat, EW)*Pdefeat, kinetic.

In an embodiment Pdefeat, cyber=(Psv|Psu)*(Psu|Pa)* (Pa|Ppl)*Ppl is the probability of defeating a threat for a cyber effect and where Ppl is the probability of placement of the cyber effect, Pa is the probability of activation of the cyber effect, Psu is the probability of success of the cyber effect and Psv is a probability indicating the extent of damage to the target that constitute the set of hierarchical parameters ingestible by the SMM.

In an embodiment, battle damage assessment (BDA) is feedback to the model to update probabilities, effect/threat vulnerabilities and constraints.

In an embodiment, the probabilities and confidence intervals for each hierarchical parameter for an effect are visualized. The smallest probabilities and/or widest confidence intervals indicate a "weakest" parameter in the effect/threat pairing.

In an embodiment, the system and method may be implemented at multiple security levels depending on the security classification of the data.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 4a and 4b illustrate different representations of the Pdefeat for the combined effects;

FIGS. 6a and 6b are screen shots of a scenario generator to generate a threat kill chain and a response of combined kinetic and non-kinetic effects to the threat kill chain;

FIGS. 7a-7c are illustrative diagrams of raw input data for a ballistic missile threat, a missile interceptor effect and a cyber effect, respectively;

FIGS. 9a-9b are illustrative diagrams of results data generated by existing analysis tools for a single type of kinetic and cyber effect, respectively, against a stage of the threat kill chain for a particular threat;

FIGS. 10a-10b are illustrative diagrams of normalized results data for a number of disparate effects in a delimited file format for ingestion by the SMM and an embodiment of an agent for normalizing XML cyber results data to a delimited file format;

FIGS. 11a-11b are diagrams of a Stochastic Math Model (SMM), according to an example embodiment, for providing dynamic feedback paths to evaluate probabilities of the combined effects;

DETAILED DESCRIPTION OF THE INVENTION

The multitude of threats and effects and existing analysis tools have widely disparate data formats that make automating the JMEM to integrate and synchronize a response that combines kinetic and non-kinetic affects against a threat kill chain in anything other than a one-off system impractical. Currently, no system or method exists to run a combined kinetic and non-kinetic effects scenario against a threat kill chain for one or more threats to generate a top-level and hierarchically decomposed probability of defeat (Pdefeat) for the individual and combined effects with confidence intervals with the flexibility to be reconfigured against disparate threats with different combinations of effects.

Figure 1:
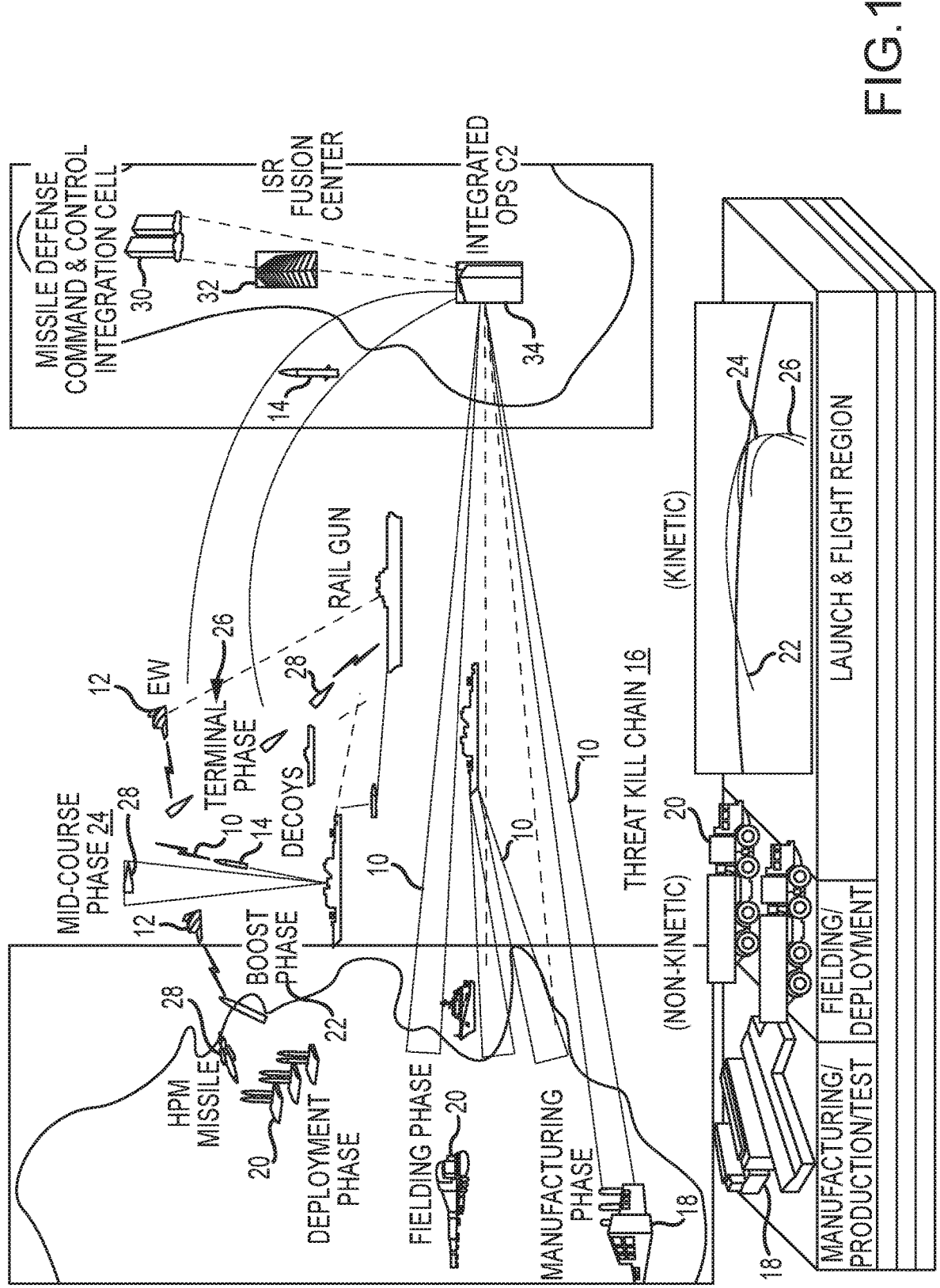
FIG. 1 is an operation view of combined cyber, electronic warfare, and kinetic effects responding to defeat disparate threats over the threat kill chain.

Referring now to the figures, FIG. 1 depicts the integration and synchronization of cyber, electronic warfare and kinetic effects 10, 12 and 14, respectively, to negate vulnerabilities in a threat kill chain 16 including manufacturing/production/test stage 18 and fielding and deployment stage 20 "left of launch" and boost, mid-course and terminal phases 22, 24 and 26 "right of launch" for an active ballistic missile threat 28. A missile defense command & control integration cell 30, ISR (Intelligence, Surveillance and Reconnaissance) fusion center 32 and Integrated Ops C2 34 coordinate the selection (and possible modification) and execution of a combined effects scenario to engage and defeat the active ballistic missile threat 28. The cyber, electronic warfare and kinetic effects can be launched from local or remote land, sea, air and space-based platforms.

The present invention provides embodiments of an automated system and method for planning and responding to disparate threats with combined kinetic and non-kinetic (e.g. cyber and electronic warfare) effects. The threat and effects inputs (e.g., physical data, simulated data, sensor data, subject matter expert inputs) and the results of analysis tools that individually apply a single effect type to negate a threat vulnerability are normalized to a form and format (e.g. a delimited file format) ingestible by a Stochastic Math Model (SMM). The normalized inputs reflect the success/failure of the effect versus a threat vulnerability as a score, not a probability. The normalized results decompose a probability of defeat (Pdefeat) for an individual effect as a set of hierarchical parameters represented as probabilities. The SMM is iteratively run on the normalized inputs and results data, including either organically or synthetically injected variability of the data, to compute and visualize a Pdefeat with an associated confidence interval (CI) for each effect and the combined effects at each stage of the threat kill chain.

This approach provides 1) understanding and trust of probabilities of defeat and confidence intervals of non-kinetic and kinetic effects as well as decomposition of the probabilities of defeat into constituent hierarchical parameters; 2) timely/actionable information; 3) mature planning tools to model the blended kinetic/non-kinetic effects for each warfighter function (e.g. planning, situational awareness, etc.) during each stage of the threat kill chain at the battle speeds across the span of Command and Control, Battle Management and Communications (C2BMC) augmenting solutions (e.g. sensors and shooters); 4) a flexible framework to incorporate existing models, algorithms, data, and effects; and 5) a kinetic versus non-kinetic trade-off assessment on feasibility to accomplish mission objectives and total cost benefit/impact.

Figure 2A:
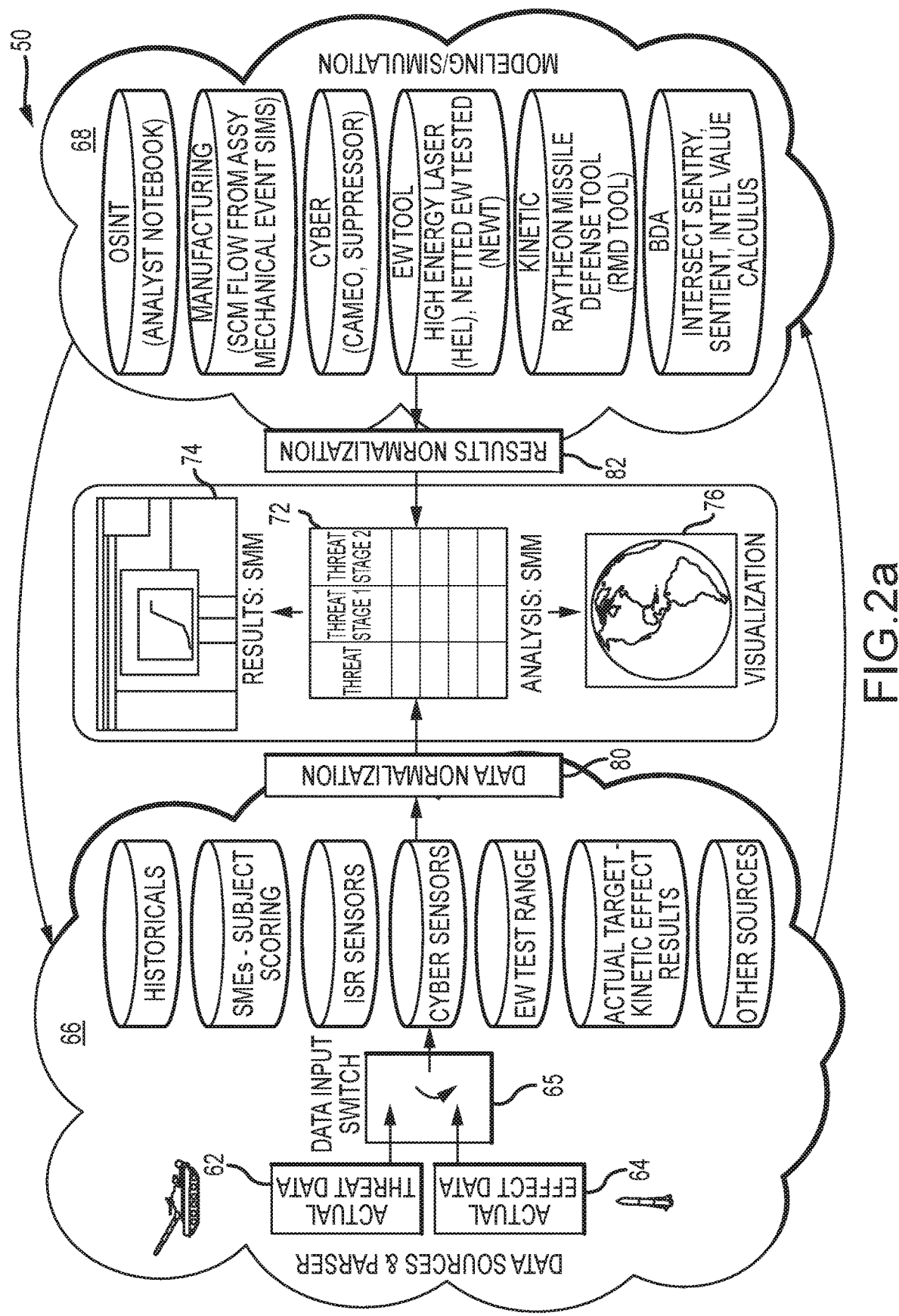
FIGS. 2a-2c illustrate embodiments of a system architecture, modular implementation and flow diagram for using a Stochastic Math Model (SMM) to simulate the planning and response of combined effects to defeat a threat.
Figure 2B:
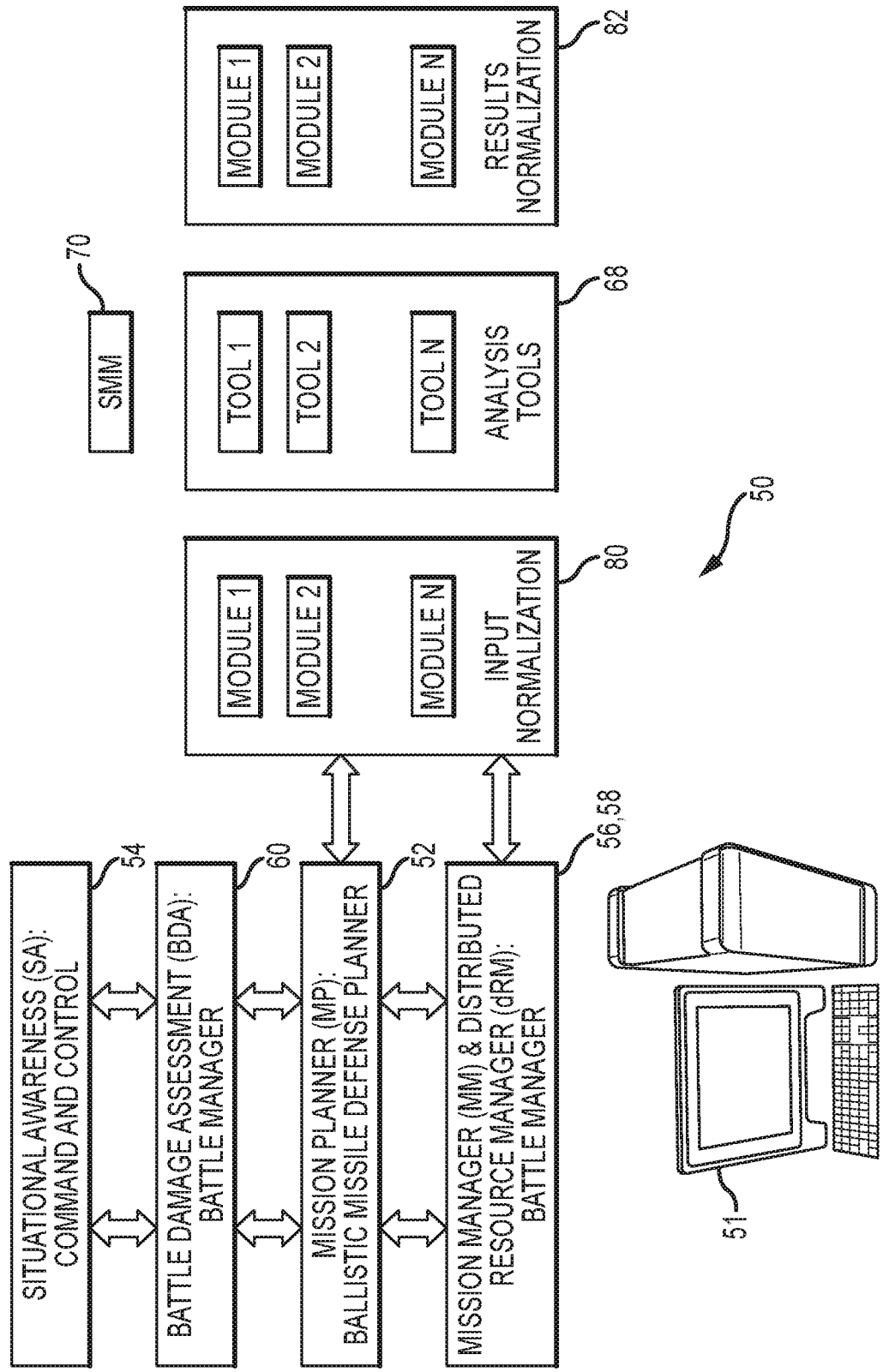
Figure 2C:
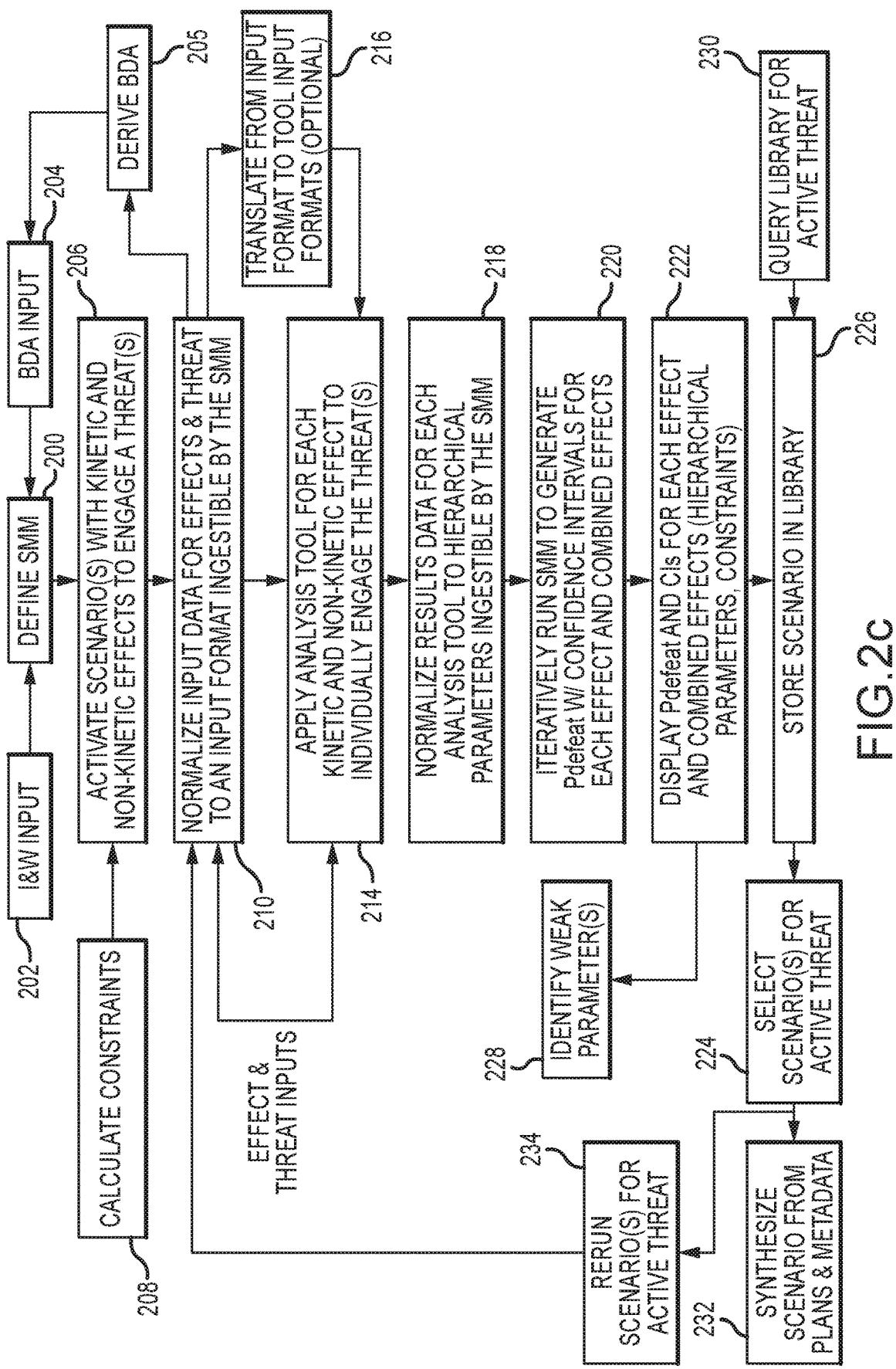

Referring now to FIGS. 2a and 2b, a coordinated response system 50 comprises a set of integrated modules residing in a computer system(s) 51 that can directly support key BMDS operational services product lines of C2BMC and other systems. The system capability is envisioned to interface with existing C2BMC functions in the following ways:

Mission Planner (MP) module 52: supports a system such as the C2BMC product line Ballistic Missile Defense Planner by providing a threat overlay and characterization from which to identify threat vulnerabilities per kill chain stage. The MP module further matches these vulnerabilities to effect techniques than may exploit and manipulate these vulnerabilities, and then derives Probability of Defeat for these Effects Per threat per threat and effect deployed sites. The Vulnerability Assessment and Technique Matching and probability of defeat functions are completed in non-real-time.

Situational Awareness (SA) 54: supports the C2BMC product line Command and Control with visualization of geolocation information for threat and effect sites, trajectories for threats, flyouts for effects, and Battle Damage Attributes associated with a System Track, Mission Manager (MM) and Distributed Resource Manager (dRM) modules 56, 58 and Battle Damage Assessment (BDA) 60: supports the C2BMC product line Battle Manager by providing Vulnerability Assessment and Technique Matching per System Track, previously performed in by the non-real-time by the MP, in near-real-time Based on the context of ongoing mission events.

Collectively, system 50 will integrate with a system such as the C2BMC product line Concurrent Test, Training, and Operations utilizing all features listed above to enable effective planning, testing, war gaming, and training for non-real time applications, and battle management for near-real-time applications.

The system modules represent integrated and synchronized capabilities that can be collocated within a single regional operation center, such as an Area of responsibility (AOR)-centric C2BMC implementation, or distributed amongst multiple operation centers using a team-of-teams approach to mission CONOPS as required. Each operations center is modeled based on its C2 functions and the cyber, EW, and kinetic effects under its control. The Distributed Common Ground System (DCGS) is modeled as the entity responsible for exploitation and dissemination of information collected during Intelligence, Surveillance and Reconnaissance (ISR) missions.

The system framework provides a structure within which to implement a unique iterative process to integrate non-kinetic and kinetic effects and assess their probability of negating ballistic missile threats (or other kinetic or non-kinetic threats). This framework enables the normalization and ingestion of diverse threat data 62 and effect data 64 types from a variety of sources 66 including but not limited to physical characteristics, sensor data, subject matter experts, simulations etc., via a data input switch 65. It also supports the orchestration and synchronization of kinetic, cyber and EW M&S and Mathematics/Probability tools, models, and other components referred to herein as "analysis tools" 68 as services through an open software architecture and visualization environment. This environment is designed so that adding, upgrading and swapping these services is easy for the end-user. The end user can then either employ the existing services provided with the system or incorporate their own. In an embodiment, the system uses the Web Services Description Language (WSDL) XML-based interface definition language for these linking these services.

The system framework has three dimensions: 1) Modules, 2) Stages of the threat kill chain and 3) Analysis Tools. The system provides flexibility by allowing the end user to define the stages as appropriate for the threat system of their scenario. The Analysis Tools (e.g., kinetic and non-kinetic M&S and analytic assessment tools and APIs). Effects described using advanced capabilities are applied to threat vulnerabilities within kill chain stages. A sample of the analysis tools 68 currently included in these groups include:

1. Analytics Group: Raytheon's Stochastic Math Model (SMM), automated Open Source Intelligence tool (OSINT), and automated Failure Mode Effectiveness Analysis tool (FMEA)
2. Kinetics Group: Raytheon's Missile Defense Tool (RMDTool)
3. EW Group: Raytheon's High Energy Laser tool (HEL)
4. Cyber Group: Raytheon's Suppressor tool and the Cyber Analysis Modeling and Evaluation for Operations (CAMEO) tool
5. Activity-Based Intelligence (ABI) group: Raytheon's Intersect Sentry tool These M&S and Mathematics/Probability tools are integrated as services within the overall framework and corresponding software architecture. The framework supports simulation integration as a service and third party M&S capabilities using this same open architecture approach.

Three of the fundamental building blocks of the system framework implemented by the MP or MM include its analytical foundation, data normalization and results normalization.

The system framework applies a new analytic technique for M&S that provides an adaptable method with which to determine the overall probabilities for a complex set of individual probabilities and time-based events. The system integrates Discrete Event Simulation with Bayesian statistics and Markov Decision Processes (MDPs) to provide probabilistic results and associated confidence intervals, derived through Monte Carlo analysis, that quantify the accuracy of those results. This accuracy is of great assistance to simulation end-users with respect to instilling confidence for Course of Action (COA) development and decision-making. Supporting this architecture is a Stochastic Math Model (SMM) 70 that performs the derivation of the Measures of Effectiveness (MOEs) and Measures of Performance (MOPs) (i.e., the probabilities and their associated confidence intervals). The system uses SMM results to enable automatic analysis of actual versus specified performance for a range of data sources as modeled in the scenarios considered here. P. Hershey and J. Chapa, "A Stochastic Model for Estimating Ballistic Missile Negation via Left of Launch Techniques," *Proc.* 82*nd MORS* (*Military Operations Research Society*) *Symposium*, Alexandria, Va., Jun. 17, 2014 is hereby incorporated by reference.

The analytic foundation provided by SMM 70 is used within each of the M&S components to characterize both kinetic and non-kinetic techniques beyond the traditional kinetic-only view of missile flight (boost, midcourse, terminal); for example, during missile manufacturing and fielding and deployment. The system provides a computation of the MOEs and MOPs for cyber, EW and kinetic effects across missile lifecycle phases for the corresponding techniques within a layered missile defense concept. This system provides a tool with which to calculate the likelihood that a specific kinetic or non-kinetic technique can be used to take advantage of one or more vulnerabilities that exist in an adversary's technologies or operations. The population of this probability parameter data per threat per effect creates the automated JMEMs. SMM 70 generates a probabilistic analysis 72 for each effect against the threat vulnerability across the threat kill chain, displays the results 74 such as in table or bar graph formats and visualizes the geolocation of threats and effects as well as the threat trajectories and effect flyouts 76 for example.

A "threat" can be characterized as a scenario in which one or more missiles (or other kinetic or non-kinetic threats) intended to destroy a friendly target are launched from a specific location within an adversary's sphere of influence. The vulnerabilities of enemy threat components can occur in the production functions required to produce and make the threat available (e.g., operations), in the threat system components (e.g., the software or hardware equipment), and in the infrastructure to place the threat into play (e.g., facilities). These vulnerabilities include weaknesses that occur within, or are introduced into, the missile life-cycle and those which can be exploited through techniques to prevent the successful operation of the enemy threat. Each of the basic layers of the missile life-cycle is divided into sub-categories which provide more detail regarding the types of vulnerabilities that might be exploited. The vulnerabilities are matched with effect techniques that can be used to exploit the various vulnerabilities and cause a partial or complete failure of the enemy missile threat, thus preventing a successful missile attack. These effect techniques are categorized as "Cyber", "EW", or "Kinetic".

The system framework provides a data format transformation and standardization capability to allow integration of diverse raw input data formats and results data formats from the various analysis tools and unification of diverse databases for centralized aggregation and correlation, thereby, allowing multi-domain and multi-dimension views of the data. This capability includes an ingest data normalization component 80 that retrieves data from sources and normalizes those data into, for example, a delimited file format for ingestion by the SMM. The SMM may process the raw input data to perform an analysis function for which an analysis tool does not exist or to assist with the normalization of the results data from the existing analysis tools. The capability also includes an ingest results data normalization component 82 that retrieves diverse results data from the analysis tools and normalized those data to a set of hierarchical parameters that compute the Pdefeat for a given type of effect against a specific threat vulnerability into, for example, a delimited file format for ingestion by the SMM. In some cases, the analysis tool may generate its output as the set of hierarchical parameters in the desired format, in which case the results data can be ingested directly by the SMM. The analysis tools may ingest raw input data or the normalized input data in the delimited file format (translated back to the standard or proprietary input format of the tool). In an embodiment, the data format transformation and standardization capability is written in Java and runs on operating systems such as Windows and Linux.

Referring now to FIGS. 2c through 15, an embodiment of an automated system and method for planning and responding to defeat disparate threats over the threat kill chain with combined cyber, electronic warfare and kinetic effects.

An initial step is to define the Stochastic Math Model (SMM) (step 200) based in part on the characteristics of possible kinetic and non-kinetic effects and kinetic and non-kinetic responses to those threats, indicators and warnings (I&W) inputs such as intelligence, surveillance and reconnaissance (ISR) data (step 202) and Battle Damage Assessment (BDA) inputs (step 204). The BDA inputs provided to in part define SMM are derived (step 205) from ISR data collected from space-based, air-based, sea-based and land-based assets that report on the success of effects against threats at each stage of the kill chain.

The SMM is a mathematical model used to determine the probability that a threat (e.g., a ballistic missile) can be defeated (i.e., Pdefeat) through kinetic, non-kinetic, and integrated effects (to include cyber, electronic warfare and kinetic techniques (e.g., missile interceptors)). The SMM uses discrete event simulation to provide a way to determine the overall Pdefeat for a complex set of probabilities and time-based events. The SMM treats "defeat" as a random variable and decomposes it into constituent factors (i.e., metrics) required for a threat vulnerability/effect technique to be effective against the threat in all stages of the kill chain (e.g., threat life cycle for a ballistic missile includes manufacturing and production, fielding and deployment, boost, mid-course, and terminal stages). Each factor is likewise treated as a random variable. SMM models multiple threat vulnerability/effect technique pairs in series and in parallel (depending on whether the effects can independently defeat the threat or must be applied together to defeat the threat) to evaluate overall $P_{defeat}$. Then Monte Carlo analysis is conduct to show the level of confidence achievable for selected threat vulnerability/effect technique pairs with respect to their associated $P_{defeat}$ estimations. These estimations assist the operators and analysis with selecting those threat vulnerability/effect technique pairings that are acceptable for meeting mission requirements.

Figure 3:
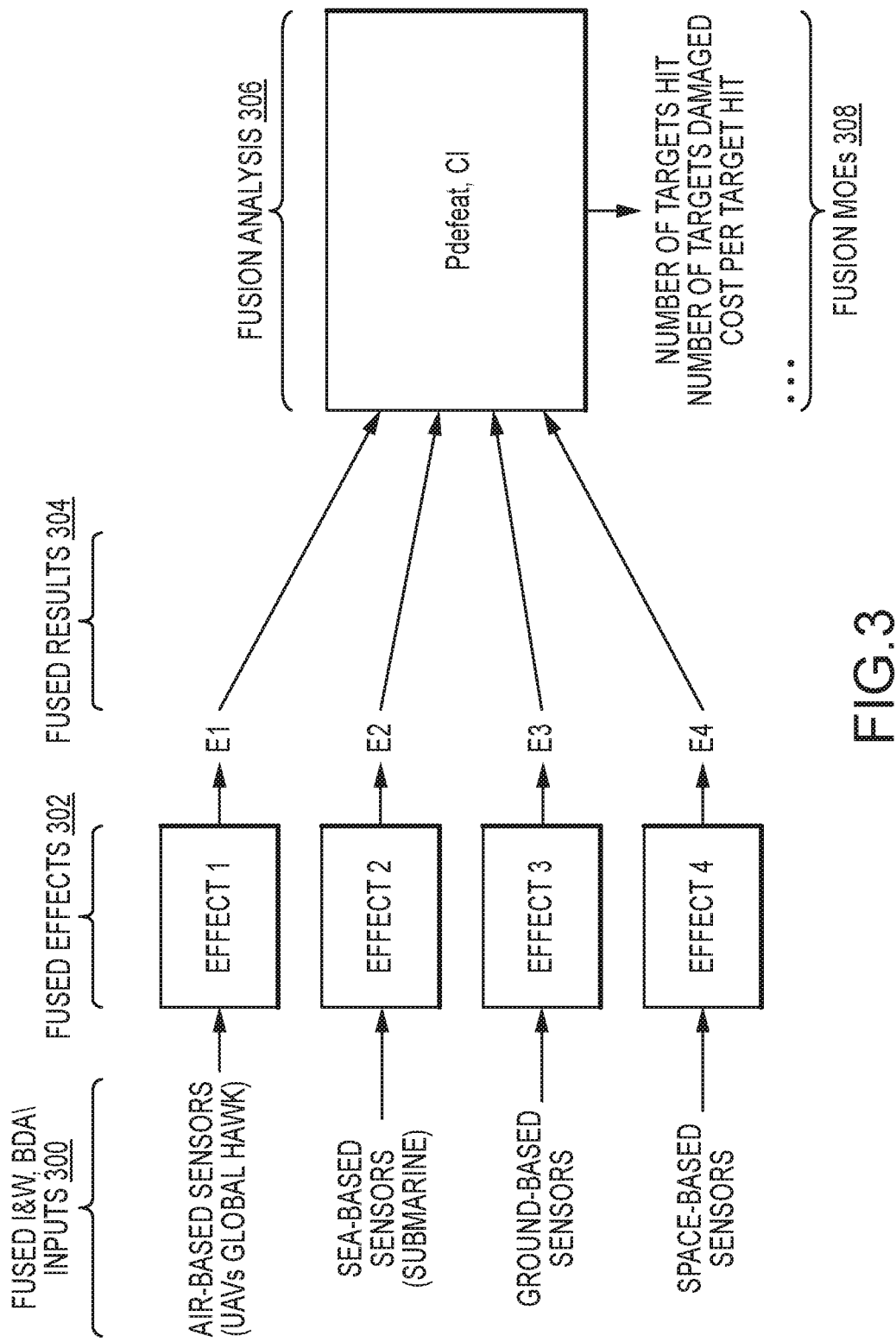
FIG. 3 is a diagram the SMM's fusion of the normalized input data and the normalized results data for combined kinetic and non-kinetic effects to generate a Pdefeat with confidence interval for each individual effect and the combined effects.

In this system and method, as shown in FIG. 3 the SMM is configured is to fuse the I&W and BDA inputs 300, fuse individual non-kinetic (e.g., cyber and EW) and kinetic (e.g., missile interceptors) effects 302 to produce fused results 304 to negate a specified threat kill chain of one or more non-kinetic or kinetic threats. Fusion analysis 306 produces a Pdefeat with an associated confidence interval for the combined effects allayed to negate the threat(s). This top-level Pdefeat may be decomposed into Pdefeat for types of effects and for the individual effects, which are each decomposed into a set of hierarchical parameters. This allows for "normalization" of the results of applying a given effect against a threat vulnerability using an existing analysis tool. Such normalization facilitates the analysis that generates the confidence intervals for each hierarchical parameter as well as the Pdefeat as well as identification of the "weakest" parameters (lowest probability, widest confidence interval). Fusion MOEs 308 provide an expected number of targets hit, expected number of targets damaged, expected cost per target hit and so forth for a given scenario of combined effects against a specific threat kill chain.

Figure 4B:
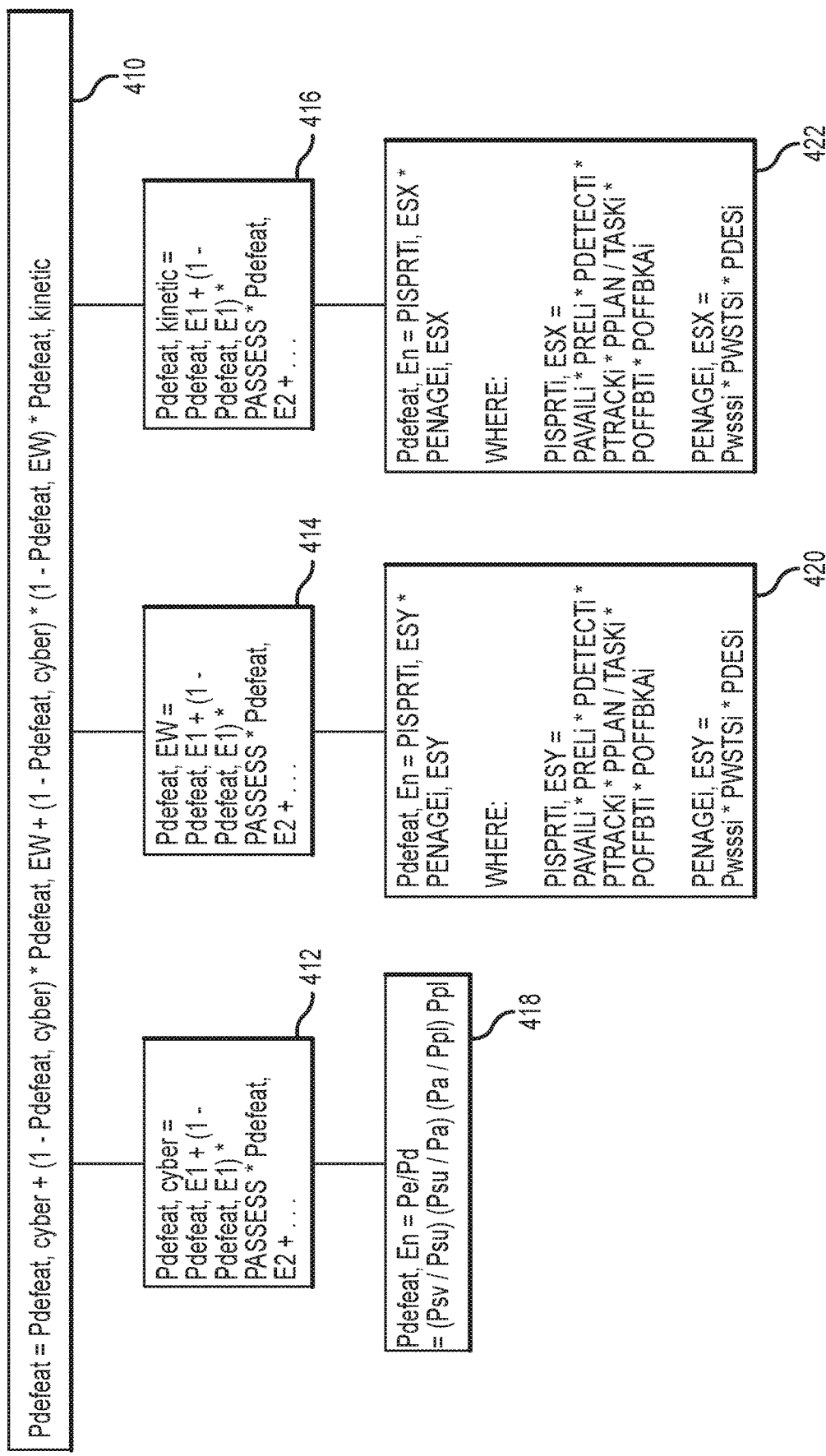

FIGS. 4a and 4b illustrate two different embodiments for calculating the top-level Pdefeat for a scenario including combined kinetic and non-kinetic effects E1, E2, E3, . . . En integrated and synchronized against a threat kill chain including one or more kinetic or non-kinetic threats. The effects E1, E2, . . . En are applied in a temporal sequence synchronized to different stages of the threat kill chain. Zero, one or multiple effects of the same or different type may be activated against a given stage. The performance (Pdefeat, En) of an individual effect may or may not be correlated (i.e., "conditioned") to effects activated against earlier stages or simultaneously against the same stage of the threat kill chain. The effects may be applied either before or after "launch" of the threat, known as "left of launch" and "right of launch". This has particular importance when the threat is a ballistic missile.

As shown in FIG. 4a, an embodiment of Pdefeat 400 is a general equation that allows for correlated or uncorrelated effects taking into account that each effect is synchronized to a stage of the threat kill chain. The cumulative probability of defeat (Pdefeat) 400 equals the probability of defeating the threat by effect E1 (Pdefeat, E1) plus the product of the probability that effect E1 failed with the probability of defeating the threat with effect E2 given that effect E1 was applied (1−Pdefeat, E1)*Pdefeat, E2|Pdefeat, E1 and so forth for the entire chain of effects in the scenario. The resulting equation is given by:

$$Pdefeat = Pdefeat, E1 + ((1 - Pdefeat, E1)*Pdefeat, E2) | Pdefeat, \quad (1)$$
$$E1 + (1 - Pdefeat, E1)(1 - Pdefeat, E2)*(Pdefeat, E3) | Pdefeat, E1,$$
$$Pdefeat, E2 + (1 - Pdefeat, E1)(1 - Pdefeat, E2)(1 - Pdefeat, E3)*$$
$$(Pdefeat, E4) | Pdefeat, E1, Pdefeat, E2, Pdefeat, E3$$

Note: If the effects are uncorrelated the probability of defeat for a given effect is equivalent to the probability of defeat for the effect conditioned on the previous effects, e.g. Pdefeat, E2=Pdefeat, E2|Pdefeat, E1.

As shown in FIG. 4b, an embodiment of Pdefeat 410 is configured based on an assumption that one or more cyber effects are applied against early stages of the threat kill chain left of launch, one or more EW effects are applied against middle stages of the threat kill chain, and one or more kinetic, effects are applied against later stages of the threat kill right of launch. The effects are assumed to be uncorrelated in this example. At the top levels of the hierarchical decomposition of Pdefeat 410 the representations of cyber, EW and kinetic are the same. As we drill down in the hierarchy to the sets of hierarchical parameters that calculate the probability of negation Pdefeat, En for an individual effect, the representations will differ. In this example, the decomposition of the cyber effects differs from that of the EW and kinetic effects. If we were to decompose the EW and kinetic effects to the next level down they would differ as well.

Pdefeat 410 is given by:

$$Pdefeat=Pdefeat,cyber+(1-Pdefeat,cyber)*Pdefeat, EW+(1-Pdefeat,cyber)*(1-Pdefeat,EW)*Pdefeat,kinetic \quad (2)$$

Where Pdefeat, cyber is the cumulative probability of defeating the threat with one or more cyber effects, Pdefeat, EW is the cumulative probability of defeating the threat with one or more EW effects, and Pdefeat, kinetic is the cumulative probability of defeating the threat with one or more cyber effects.

Each of these effect-type Pdefeat, cyber 412, Pdefeat, EW 414 and Pdefeat, kinetic 416 are further decomposed as the sum the probability of defeating the threat by effect E1 (Pdefeat, E1) plus the product of the probability that effect E1 failed with the probability of defeating the threat with effect E2 (1−Pdefeat, E1)*Pdefeat,E2 and so forth for the entire chain of effects in the scenario.

In an embodiment, Pdefeat, En 418 for cyber effects decomposes into the Probability of Effectiveness (pEffect=Pe) conditioned upon Probability of Deployment (pDeploy=Pd).

$$Pdefeat,En=(Pe|Pd)*Pd \quad (3)$$

pDeploy (Pd) is decomposed into the Probability of Activation (pActive=Pa) conditioned upon Probability of Placement (pPlace=Ppl)) multiplied by Ppl. Recognizing that the timing of placement and activation are not always the same. Pd is the probability that a cyber effect is enabled to accomplish its purpose (i.e., is activated) given that it has been placed within or against a target system:

$$Pd=(Pa|Ppl)*Ppl \quad (4)$$

pEffective is decomposed into pSevere (Psv) conditioned upon the pSuccess (Psu) multiplied by Psu conditioned upon Pa, multiplied by Pa conditioned upon Ppl, multiplied by Ppl, where Psu is the probability that the cyber effect can successfully perform its intended mission on a target given that the effect is enabled to accomplish its purpose (i.e., is activated), given that it has been placed within or against a target system, and Psv is an indication of the extent of damage imposed on the target given that the effect was successful:

$$Pe=(Psv|Psu)*(Psu|Pa)*(Pa|Ppl)*Ppl \quad (5)$$

The fully decomposed expression for Pdefeat is a linear Bayesian network given by 1010:

$$Pdefeat,En=Pe|Pd=(Psv|Psu)*(Psu|Pa)*(Pa|Ppl)*Ppl \quad (6)$$

At this level, in an embodiment the decomposition of the Pdefeat, En 420, 422 for the EW and kinetic effect are the same $$Pdefeat,En=PISPRTi,ESY*PENAGEi,ESY \quad (7)$$

Where:

$$PISPRTi, ESY=PAVAILi*PRELi*PDETECTi*PTRACKi* PPLAN/TASKi*POFFB Ti*POFFBKAi \quad (8)$$

$$PENAGEi,ESY=Pwsssi*PWSTSi*PDESi \quad (9)$$

Where PAVAILi is for effect availability, PRELi is the reliability, PDETECTi is detection, PTRACKi is for tracking, PPLAN is for plan and task, POFFBTi is for off-board target selection, POFFBKAi is for off-board kill assessment, Pwsssi is for weapon system support, PWSTSI for weapon system target selection and PDESi is for destroy and together constitute the set of hierarchical parameters for either an EW or kinetic effect at this level of the hierarchy.

Figure 5:
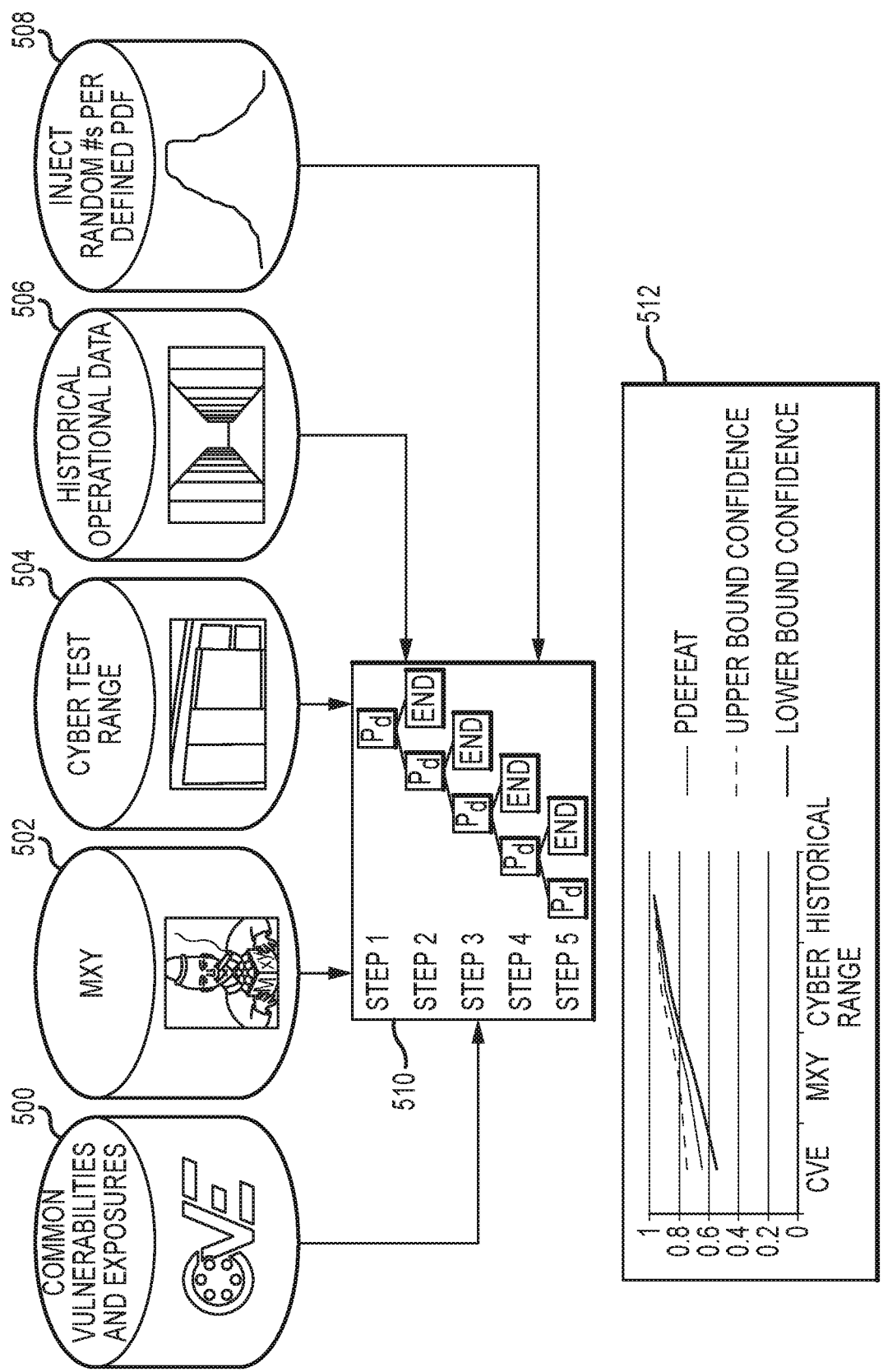
FIG. 5 illustrates different organic and simulated sources of data fidelity and variability ingested by the SMM that effect the confidence intervals.

Referring now to FIG. 5, as described above, the system uses data normalization tools to ingest real data from multiple sources and disseminates that data in a useable form and format to the other analysis tools used by the system, including the SMM, with the purpose of providing a single "normalized" Probability of Defeat (Pdefeat) across all stages of the threat kill chain. When test data is not available, some analysis tools provide a Pdefeat based on subjective input, such as a scoring system (e.g., Common Vulnerabilities and Exposures tool 500 from NIST). When scores are not available, and in the absence of test data, the system applies another tool to incorporate subjective Pdefeat inputs based on subject matter expert (SME)-derived probability distribution functions Mxy 502 (e.g., the Failure Mode Effectiveness Analysis (FMEA) tool). In a best case scenario, Pdefeat is provided from test range data derived from executed test runs in a controlled environment (e.g., Raytheon's cyber range test tool 504 run with cyber effects deployed against targets in a cyber test range, such as Raytheon's Cyber Operations and Development Evaluation or CODE Center). Another possible source is Historical Operational Data 506. All of these sources can provide data variability that is required to generate confidence intervals. Alternately, random numbers based on a defined probability density function (PDF) 508 can be injected into the various sources to provide or enhance the variability at any desired level of fidelity.

For each of these cases, the SMM takes the Pdefeat results, performs a Monte Carlo Analysis, and derives associated confidence intervals for each hierarchical parameter 510 that calculates the Pdefeat for an effect. As both the data and the analysis tool data fidelity improves, the SMM confidence intervals 512 are tightened. Random numbers based on PDF 508 can be injected at any desired fidelity. This approach enables prioritization of effects based on both Pdefeat and the associated confidence interval. The tools also provide probabilities and confidence intervals for each hierarchical parameter for each effect deployed against a threat vulnerability. This allows the system or user to identify, and possibly, remedy weak links (low probabilities or wide confidence intervals) in the fully decomposed chain of an effect.

Once the SMM is defined, the method activates a scenario (s) with kinetic and non-kinetic effects to engage a threat(s) (step 206). As shown in FIGS. 6a and 6b, in an embodiment a user interacts with a GUI 600 to select "create attack plan" 602 to define a threat kill chain 604 for one or more threats.

The threat kill chain will include such parameters as stage name (e.g., manufacturing, fielding and deployment, boost, mid-course, terminal), sub-stage name (e.g., SE design, supply chain, manufacturing, field to boost, flight-boost etc.), activity start time, threat/group count. Alternately, the user can access a library to select, and possibly modify, an existing kill chain. Next the user interacts with GUI 600 to select "select effects" 606 to define a scenario 608 including combined kinetic and non-kinetic effects synchronized to different stages of the threat kill chain. The scenario will include such parameters as effect name (e.g., calibration, denial of service, cyber GPS, GMD), technique type (e.g., cyber or kinetic), stage (e.g., manufacturing, fielding and deployment, boost, mid-course, terminal) and sub-stage (e.g., manufacture to field, field to boost, command/C2-boost, flight-midCourse, flight terminal). Alternately, the user (or computer autonomously) can access a library to select, and possibly modify, an existing scenario for the threat kill chain.

In an embodiment, one or more constraints selected from a policy on the use of effects (e.g., based on legal or political considerations), effect cost, effect availability (e.g., stockpile numbers and depletion) and an effect threat readiness level (TRL) are generated for the candidate scenario (step 208). The constraints may be used to either pre-screen scenarios at step 206 prior to modeling or to visualize the constraints with the probabilities for the scenario to facilitate user evaluation and selection.

Once the SMM is defined and a scenario is activated for the threat kill chain, the input data for effects and threats is normalized to an input format ingestible by the scenario generator and SMM (step 210). The input data is normalized to both form and format. As to form, similar characteristics such as trajectory, speed, location, effect on a threat vulnerability etc. need to be normalized in order to be processed in a like manner by the SMM. In general, the normalized inputs reflect the success/failure of the effect versus a threat vulnerability as a score, not a probability. As to format, the normalized inputs are translated from the source format e.g. Excel file to an ASCII or text based delimited file format (e.g., a comma separated values (CSV) file) that is ingestible by the SMM.

Figure 7A:
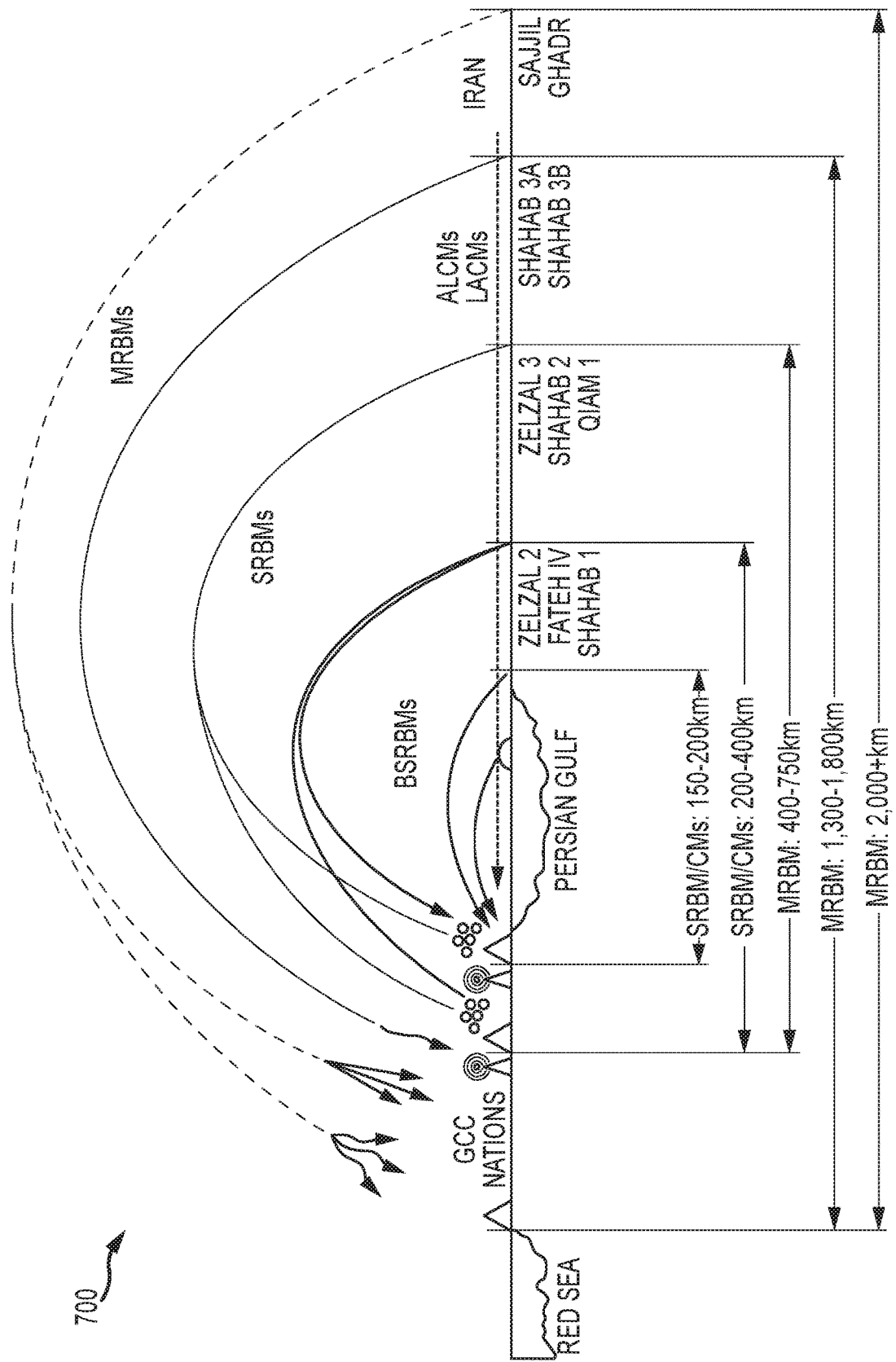
Figure 7B:
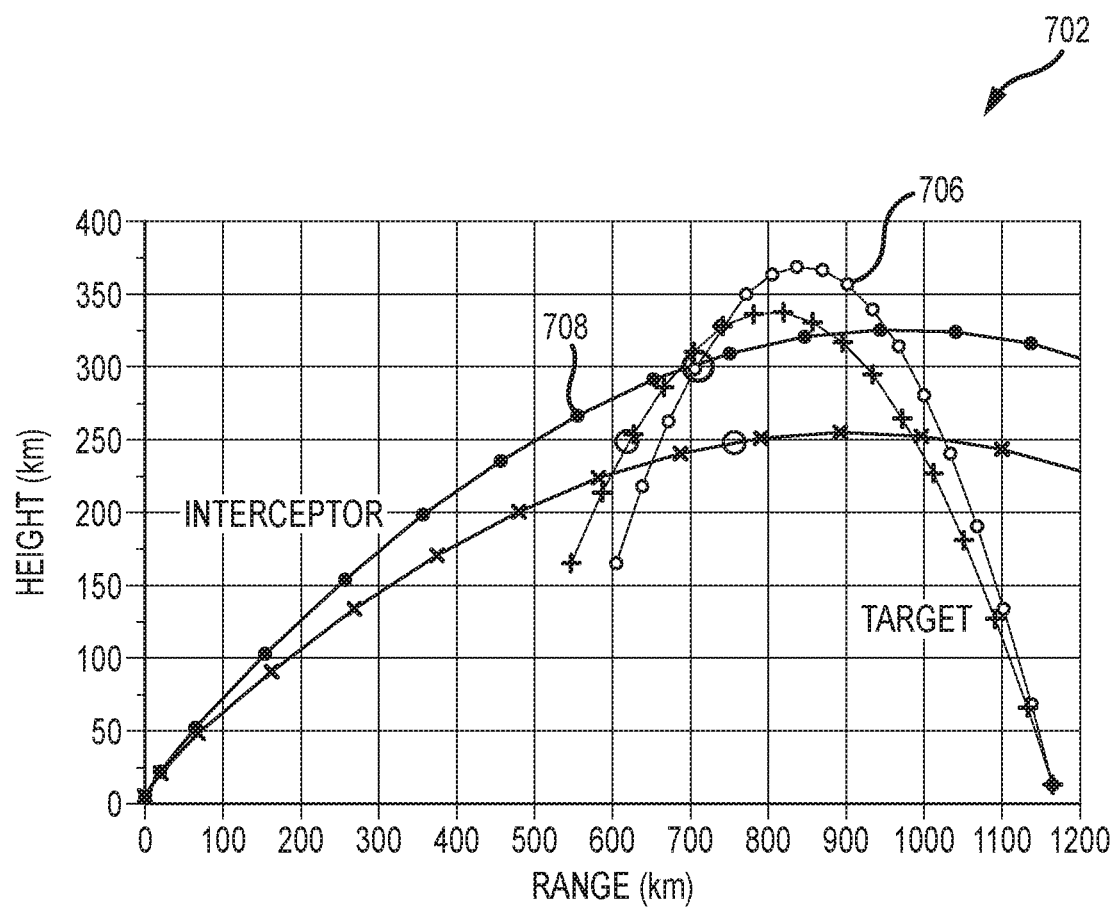

Referring now to the figures, FIGS. 7a-7c depict raw input data 700, 702 and 704 for a kinetic threat, kinetic effect and a non-kinetic effect respectively. In this example, the threat data 700 provides trajectories from source to target for a ballistic missile threat. More generally, threat data may include range, speed, size, trajectory, maneuverability, countermeasures, susceptibility to attack, geolocation, number of threats for a ballistic missile threat. This data may be known, sensed, simulated or provided by a subject matter experts and is made available in many different forms and formats. In this example, effect data 702 consists of two trajectories for both the target 706 and the interceptor 708 launched with different burnout angles at 30-second intervals marked relative to the time of launch of the target missile. More generally, effect data for an interceptor may include range, speed, flyout pattern, maneuverability, geolocation, number of interceptors available and target location error. This data may be known, sensed, simulated or provided by a subject matter experts and is made available in many different forms and formats. In this example cyber effect data 704 is given by scores in table 710 and logical ANDs and ORs in table 712 that define different combinations of the cyber effect.

The scores represent subjective assessments of the success of a particular cyber effect against and particular vulnerability of a particular threat. The table 710 shows subjective scores (ranging from 0 to 5) from 5 different Subject Matter Experts (SMEs) for one cyber effect against one threat vulnerability. The SMM translates these scores into a uniform probability distributed function with values between 0 and 1 to represent the probabilities for Pd, Pa, Psu and Psv metrics (provided by equations 3-6 above). Table 712 shows 5 different cyber effects applied against 3 different threat vulnerabilities. The ANDs represent those effects that must be combined with other effects to exploit the vulnerability and the ORs represent those effects that could individually exploit the vulnerability. The combination of ANDs and ORs, along with the SMM converted scores combine to fill in the parameter values for the linear Bayesian network of equation 6 above. Different cyber effect data may include placement time, activation time, level of degradation (e.g., score). This data may be known, simulated or provided by a subject matter experts and is made available in many different forms and formats.

Figures 8A, 8B:
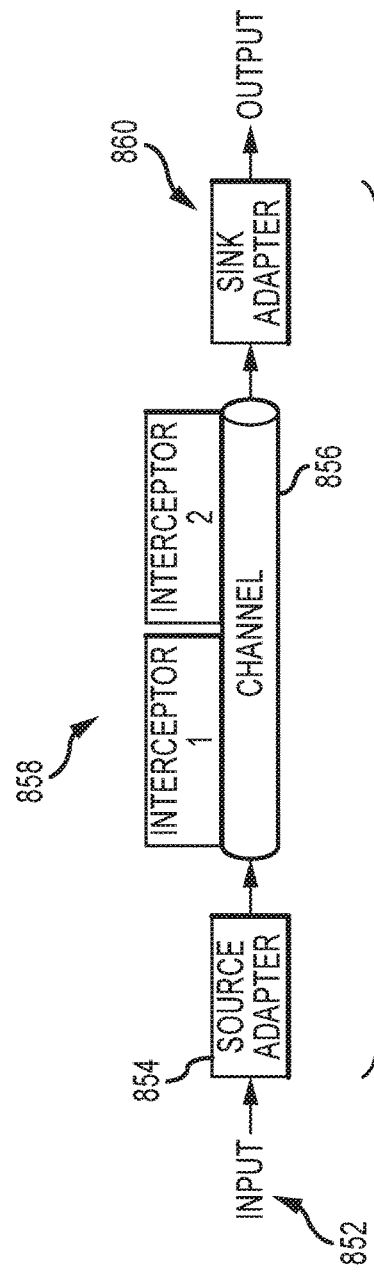
FIGS. 8a-8b are illustrative diagrams of normalized input data in a delimited file format for ingestion by the SMM and a diagram of an agent for normalizing raw input data into the delimited file format.

Referring now to FIG. 8a, in an exemplary normalized input 800 the inputs reflect the success/failure of the effect versus a threat vulnerability as a score from 1 to 5. In this example, each row of the table is a different effect and each row is the score assigned by a different subject matter expert (SME) group. For example one SME group may characterize a particular ballistic missile threat by identifying vulnerabilities of the threat at each stage of the kill chain. A different SME group, familiar with cyber effects would score those cyber effects against the vulnerabilities. A different SME group, familiar with EW effects would score those EW effects against the vulnerabilities. Yet another different SME group, familiar with kinetic effects would score those kinetic effects against the vulnerabilities. The table is represented in a delimited file format such as a CSV file. The column headings will vary depending on the source of the input data.

Referring now to FIG. 8b, an embodiment of an Agent 850 for normalizing input data 852 from its raw form and format to the score form in the delimited file format and distributing the data includes a source adaptor 854 that retrieves data from diverse sources and normalizes that data through an adaptation process. The adaptation process is a rules-based module that maps a source of input data (form and format) to scores in the delimited file format. The rules in the module are based on knowledge of the input form and format, SME inputs, sensor inputs, and simulations. The types of rules range from simple to complex. For the simple case, the rules support the input data normalization process by directing functions such as the translation from various data formats to a text based delimited file format (e.g., a comma separated values (CSV) file) that is ingestible by the SMM. For the next level of complexity, the rules enable incorporation and normalization of threat and effects specific parameters from raw data for ingestion by SMM to apply to Pdefeat computations. At the highest level, the rules translate the input data into mission events and conditions, such as "A new threat has entered the battlespace that has changed the Rules of Engagement (ROE)." These events then trigger actions, such as "select a new set of effects either from an existing mission plan or from a list of possible effects to apply against the new threat. When an action is triggered, it is said to go from a dormant state to an active state. At all complexity levels, the rules module actions can be implemented both through an automated process and directly by the system operators. The rules module design allows the operators to monitor the input data and to overwrite an automated rules decision. This information is then disseminated over a channel 856 to either the SMM or the other M&S tools via interceptors 858 (e.g., interceptor one for SMM, Interceptor 2 for RMDTool). Dissemination is done over a distributed message bus or the data are stored database until required by one of the tools for analysis at the appropriate level in the hierarchy. SMM and/or the M&S tools ingest the data and provide analysis, such as Pdefeat. The resulting data are then transmitted to the end users via a Situational Awareness tool, such as TBSA, or as feedback to one of the M&S tools or SMM for Monte Carlo analysis. The dissemination back to the original tools is done through an adaptor—sink adaptor 860.

Different effect-specific analysis tools are applied to each type of kinetic and non-kinetic effect to individually negate a threat (step 214) and generate results data for each said effect-threat pair. An analysis tool is typically configured to apply a type of effect to negate a specific type of threat and possibly to negate a specific stage or sub-stage of the threat kill chain. For example, an analysis took may model and simulate an interceptor (effect) to negate a ballistic missile (threat) during its mid-course flight (stage). The same tool may apply multiple instances of the same type of effect against the threat, at the same or different stages of the threat kill chain. Each analysis tool may ingest the raw effect and threat input data directly and perform any necessary translation to ingest the data into the tool internally. Alternately, the data maybe retranslated from the normalized input format (step 216) to a format required for ingestion of the data by the tool.

Figure 9B:
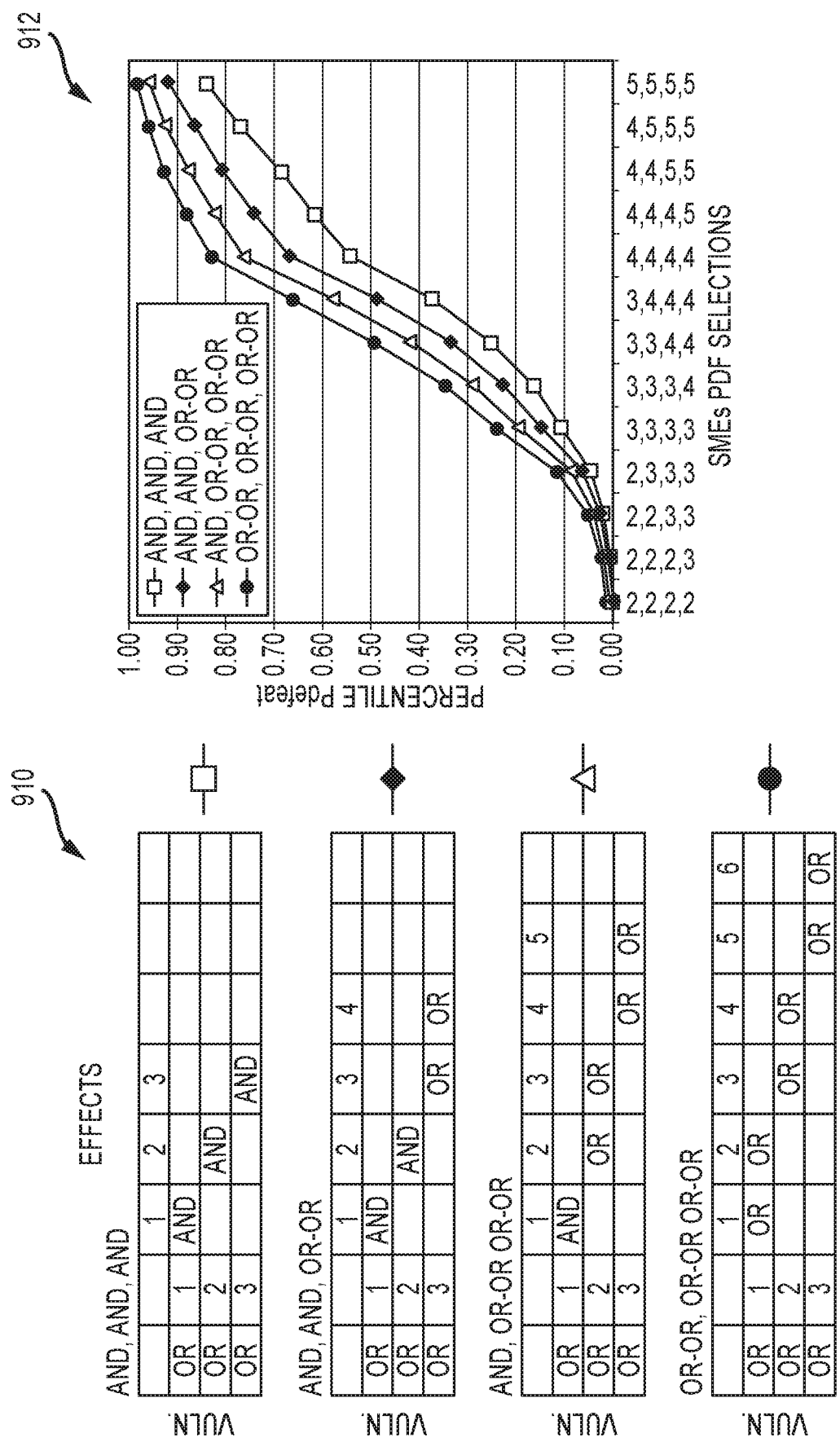

The form and format of the results data is tool specific. In general, the format may not be ingestible by the SMM and the form may not lend itself to fusing of effect results to compute the Pdefeat and confidence intervals for the combined effects in a given scenario. For example, FIG. 9a depicts the results data 900 generated by a kinetic simulator that models the use of an interceptor to defeat a ballistic missile. The results data are generated in the form of a table that provides a list of the individual threat vehicles (e.g., individual ballistic missiles) that we call the threat identifier and the resulting Pdefeat. As was previously shown in FIG. 4b and equations 7-9, the Pdefeat for a kinetic effect is decomposed into a set of hierarchical parameters each having an assigned probability. The results data 900 must be normalized into this set of hierarchical parameters. FIG. 9b depicts the results data 910 and 912 generated by a cyber simulator that models the use of a cyber effect to defeat a threat. The results data are generated in the form of tables 910 and charts 912 Tables 910 show the AND and Or combination for 4 different vulnerabilities and three different cyber effects. The ANDs represent those effects that must be combined with other effects to exploit the vulnerability and the ORs represent those effects that could individually exploit the vulnerability. The combination of ANDs and ORs, along with the SMM converted scores combine to fill in the parameter values for the linear Bayesian network of equation 6 above. FIG. 9b shows Pdefeat percent derived for these tables computed from subjective scores (ranging from 0 to 5) from 13 different Subject Matter Experts (SMEs). The Pdefeat curve was derived by SMM through translation of these scores into a uniform probability distributed function with values between 0 and 1 to represent the probabilities for Pd, Pa, Psu and Psv metrics (provided by equations 3-6 above) and represented in the figure by the 13 groups of 4 numbers on eh X axis (SME PDF Selections). Similarly, results data 910 must be normalized to a set of hierarchical parameters, which are assigned probabilities, for a fully decomposed Pdefeat as shown in FIG. 4b and equation 6.

Figure 10A:

For each effect, the results data must be normalized (step 218) as to form into the appropriate fully decomposed expression for Pdefeat and as to format to be ingestible by the SMM. As with the raw input data, the results data are normalized into, for example, a delimited file format 1000 such as a CSF file as shown in FIG. 10a. Similar to the normalization of the raw input data, normalization of the results data uses an Agent and a source adaptor implement by a rules-based module similar to the generic representation shown in FIG. 8b. The results rules-based module is implemented as a software module that takes the "results" from some M&S component and normalizes those results, based on a set of "rules," into the hierarchical parameters that define Pdefeat for an effect/threat pair. The "rules" for a given module are determined based on the form and format of the results data for a given analysis module, any other information as to the architecture and algorithm of the tool provided by the tool supplier, the raw input data provided to the tool, and rules provided by subject matter experts. Similar to input data normalization, the types of rules for results normalization range from simple to complex. For the simple case, the rules support the results normalization process by directing functions such as the translation from various results data formats to a text based delimited file format (e.g., a comma separated values (CSV) file) that is ingestible by the SMM. For the next level of complexity, the rules enable incorporation and normalization of threat and effect specific parameters from M/S tools for ingestion by SMM to apply to Pdefeat computations. At the highest level, the rules translate the results data into mission events and conditions, such as "A new threat has entered the battlespace that has changed the Rules of Engagement (ROE)." These events then trigger actions, such as "select a new set of effects either from an existing mission plan or from a list of possible effects to apply against the new threat. When an action is triggered, it is said to go from a dormant state to an active state. The rules module actions can be implemented both through an automated process and directly by the system operators. The rules module design allows the operators to monitor the input data and to overwrite an automated rules decision. An exemplary rules-based module 1010 for normalizing an XML cyber effect to the fully decomposed probabilities for the cyber effect in a CSV file format is shown in FIG. 10b.

Once the SMM is defined and the normalization of the raw input data and results data is configured, the SMM\is iteratively run on the normalized input and results data to compute a probability of defeat (Pdefeat) with an associated confidence interval (CI) for each said effect and the combined effects at each stage of the threat kill chain (step 220). The SMM is iterated on every parameter for every effect in the hierarchical decomposition until the probabilities converge and a confidence interval is determined. Each analysis tool is rerun at each iteration on different input data. The variability provided either organically through different sources of data (e.g., sensors, simulations, etc.) or synthetically by injecting random numbers into the sources of data is critical to establishing the probabilities and confidence intervals for each parameter.

Figure 11A:
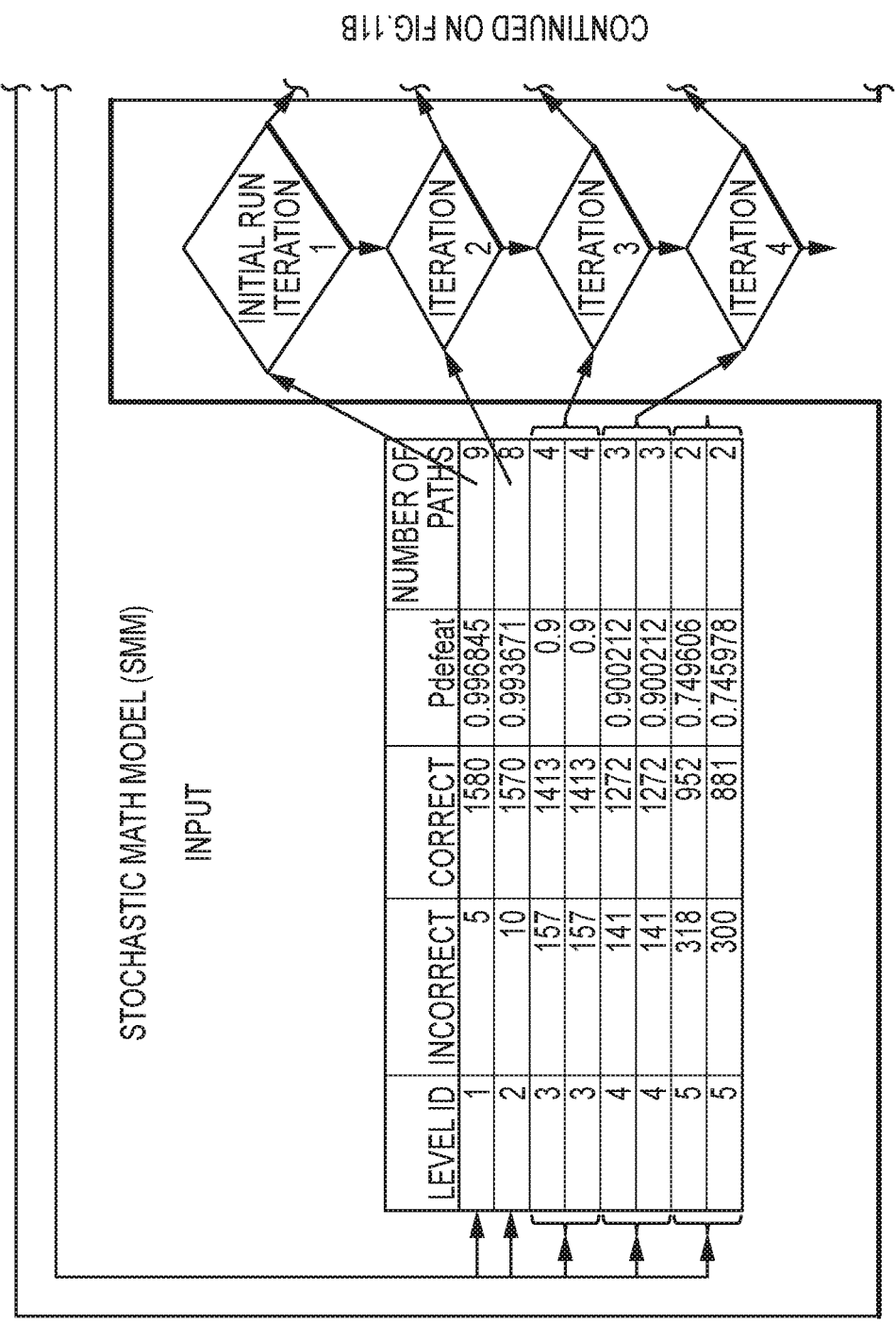

As shown in FIGS. 11a-11b, a Discrete Event Simulator (DES) may be used to implement a SMM 1100 and to include a Monte Carlo analysis that feeds normalized input data and normalized results data through an iterative process to derive probabilities with associated confidence levels based on variation in the data as reflected by the standard deviation. The iterative process works as follows The LEVEL ID corresponds to the iteration number. The number of INCORRECT and CORRECT assessments of negations of the threat by an individual effect or the integration of multiple effects is determined in the first iteration based on BDA and thereafter based on SMM runs on new input and results data. The UPPER BOUND and LOWER BOUND are the top-level Pdefeat +/− the Standard deviation/100 and the CI UPPER and CI LOWER are the Standard deviation/100. The first time through the chain (left side of FIG. 11a) the training produced a Pdefeat of 0.996945 for level 1. No Monte Carlo analysis had yet been run. The right side of FIG. 11b shows the results of the Monte Carlo analysis in which the data set was iterated 100 times. A normal probability distribution was assumed and the standard deviation for each level was then computed. Pdefeat and the associated confidence level is then fed back for all levels for use with next set of objects and object instances.

For this example, the DES implements the SMM of the cumulative Pdefeat equation for the integrated effects (i.e. Equation 6 above) and conducts a Monte Carlo analysis to compute the conditional probability, Pdefeat and confidence interval at each level. The DES comprises a collection of techniques that, when applied to a discrete-event dynamic system, generates sequences, called sample paths, that characterize its behavior. The collection includes modeling concepts for abstracting the essential features of a system and converting these into computer executable code that then generates the required sample-path data, outlining procedures for converting these data into estimates of systems performances, and then illustrating methods for assessing how well these estimates approximate true but unknown system behavior. This concept of modeling complex systems provides a relatively low-cost way of gathering information for decision-making. See J. Sokolowski and C. Banks. *Principles of Modeling and Simulation: A Multidisciplinary Approach*, Wiley & Sons ©2009 and G. Fishman, *Discrete—Event Simulation: Modeling, Programming, and Analysis*, Springer ©2001.

There are a number of DES tools available that enable the generation of a system model and the execution of experiments using that model as the system progresses through time. Models enable observation of how a real-world activity will perform under different conditions and to test various hypotheses. A principal benefit of a DES model is that it provides a simple approximation of a process and enables a gradual refinement of the model as understanding of the process improves. This "stepwise refinement" achieves good approximations of complex problems. An example of a DES tool is ExtendSim (See ExtendSim User Guide, Imagine That Inc., ISBN: 978-0-9825040-1-7, © 2013 and ExtendSim Developers Reference, Imagine That Inc. ISBN: 978-0-9825040-4-8, © 2013) with which one can develop dynamic models of real-life processes in a wide variety of fields. ExtendSim may be used to create models from building blocks, explore the processes involved, and see how they relate. If initial assumptions change, then the inputs to ExtendSim can flexibly be changed to derive a refined solution.

DES training begins with Pdefeat for the initial iteration. Pdefeat must be computed each effect applied against a given threat within a given threat scenario. Pdefeat for iteration 1 (Pdefeat1) may have been derived by stand-alone M/S tool, different from SMM, where the M/S tool Pdefeat result data is normalized for ingestion into SMM. If there exist no M/S initial results for Pdefeat for a given effect, then a set of source data of a particular data type (e.g., images, geolocation coordinates, trajectories) is ingested directly into SMM, and SMM computes Pdefeat1. The next iteration of SMM computes Pdefeat2 and the associated confidence level based on the Pdefeat1 from iteration 1 and a second set of source data (Iteration 2). This is a conditional probability $P_{defeat2}=(P_{defeat2}|P_{defeat1})P_{defeat1}$ where the a priori probability for the second iteration Pdefeat1. If there is only one effect, then the Pdefeat2 becomes the conditional probability of iteration $3P_{defeat3}=(P_{defeat3}|P_{defeat3})P_{defeat2}$ (step 3). This process continues until the Monte Carlo results converge. FIG. 11a-b shows an example with 4 iterations.

If there are multiple effects (e.g., 1 cyber effect, 2 EW effects, and 1 kinetic effect) that are to be integrated to derive a single Pdefeat, then each effect is processed in the same way (Step 4). If there are multiple effects applied to a single threat, then the data for each effect is processed as an iteration through the SMM according to the time order in which the respective effects are applied in the kill chain, and a Pdefeat is computed at each iteration for the integrated set of effects. Additionally, a Monte Carlo analysis is conducted at each iteration to determine a standard deviation for the Pdefeat computation of the integrated set of effects against the threat. This standard deviation translates in to a confidence interval to match with Pdefeat for the integrated set of effects at each iteration (step 5). Upon completion of processing of every iteration for the integrated set of effects, the resulting Pdefeat is feedback to serve as the next a priori probability to begin the next iteration that will compute a new conditional probability (i.e., a linear Bayesian net) with the final result being Pdefeat and confidence interval computation for the integrated set of effects. (Step 6).

Upon completion of the simulation, the Pdefeat and confidence intervals for each effect and the combined effects are displayed in, for example, tabular or bar graph form at different levels of the hierarchical decomposition across the entire kill chain (step 222). The user may select the scenario for implementation against an active threat (step 224), store the scenario as part of a library (step 226) or discard the scenario. The user may identify one or more weak parameters for individual effects based on parameter probability values (low) or confidence intervals (wide) (step 228) and mark those parameters for further investigation or development to increase the probability or tighten the confidence interval.

Figure 12:
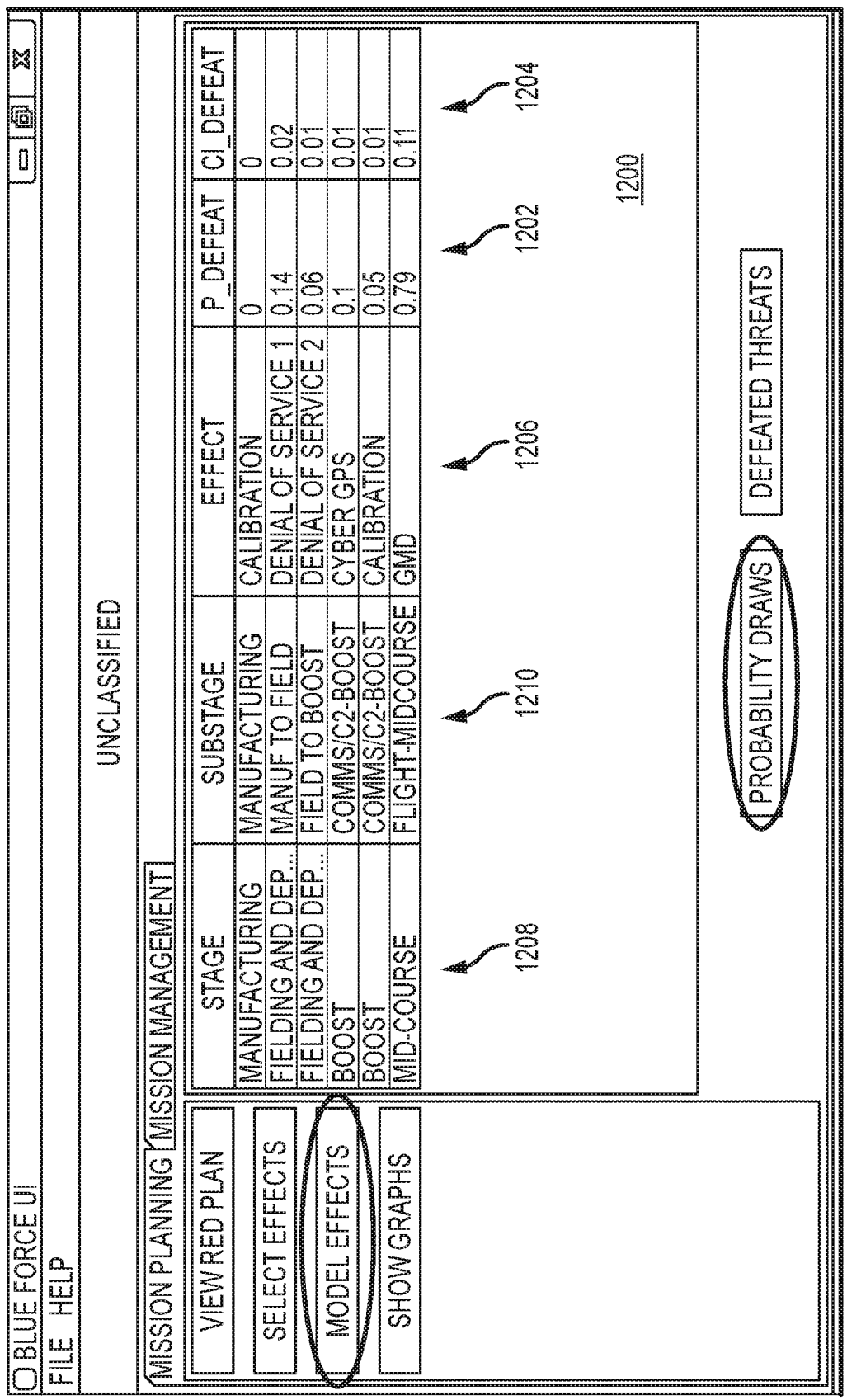
FIG. 12 is a screen shot of the Pdefeat and confidence interval for each effect at a different stage of the threat kill chain.
Figure 13A:
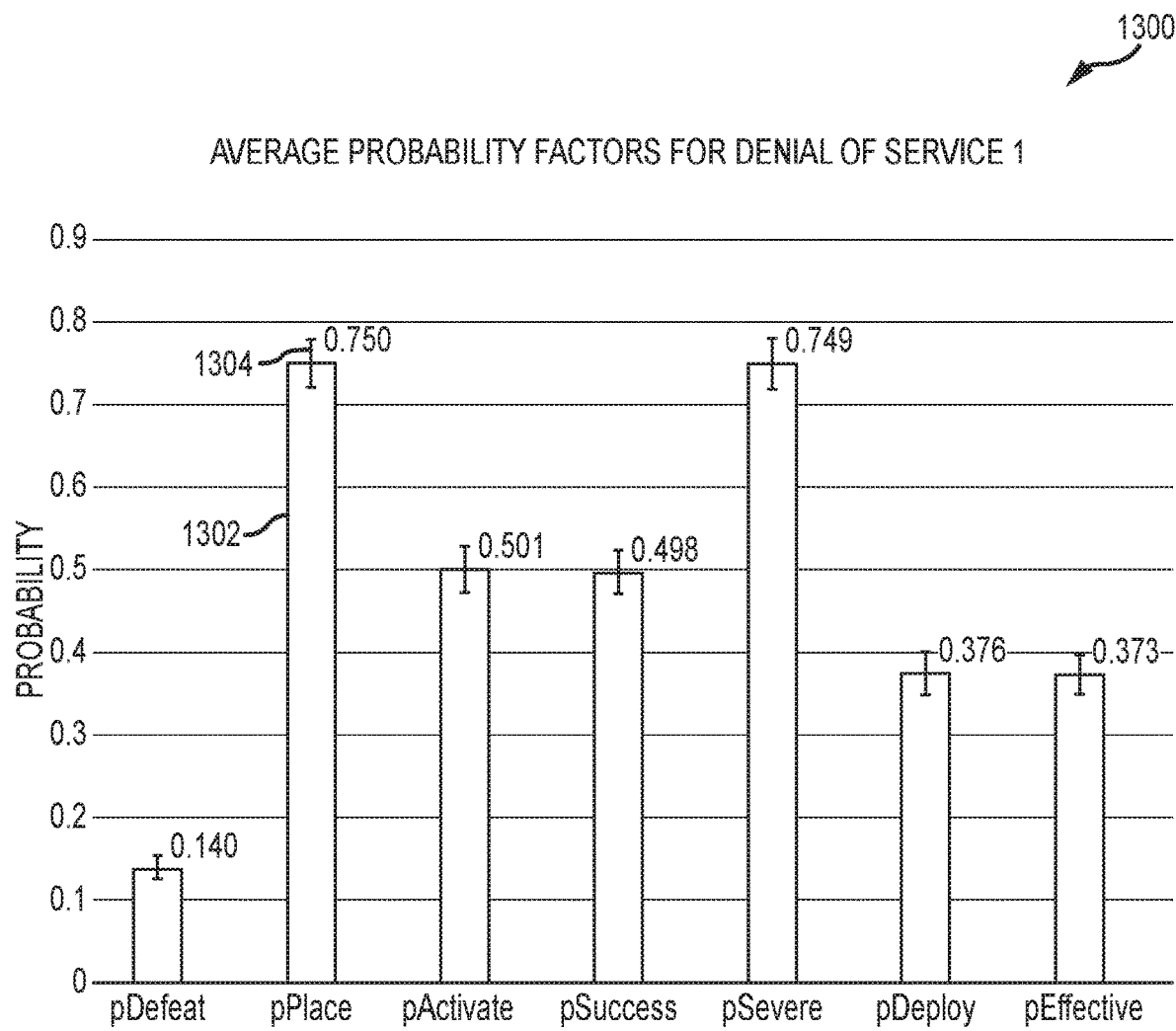
FIGS. 13a-13b are bar graphs illustrating the probabilities and confidence intervals associated with the hierarchical parameters for cyber effects at different stages of the threat kill chain.
Figure 13B:
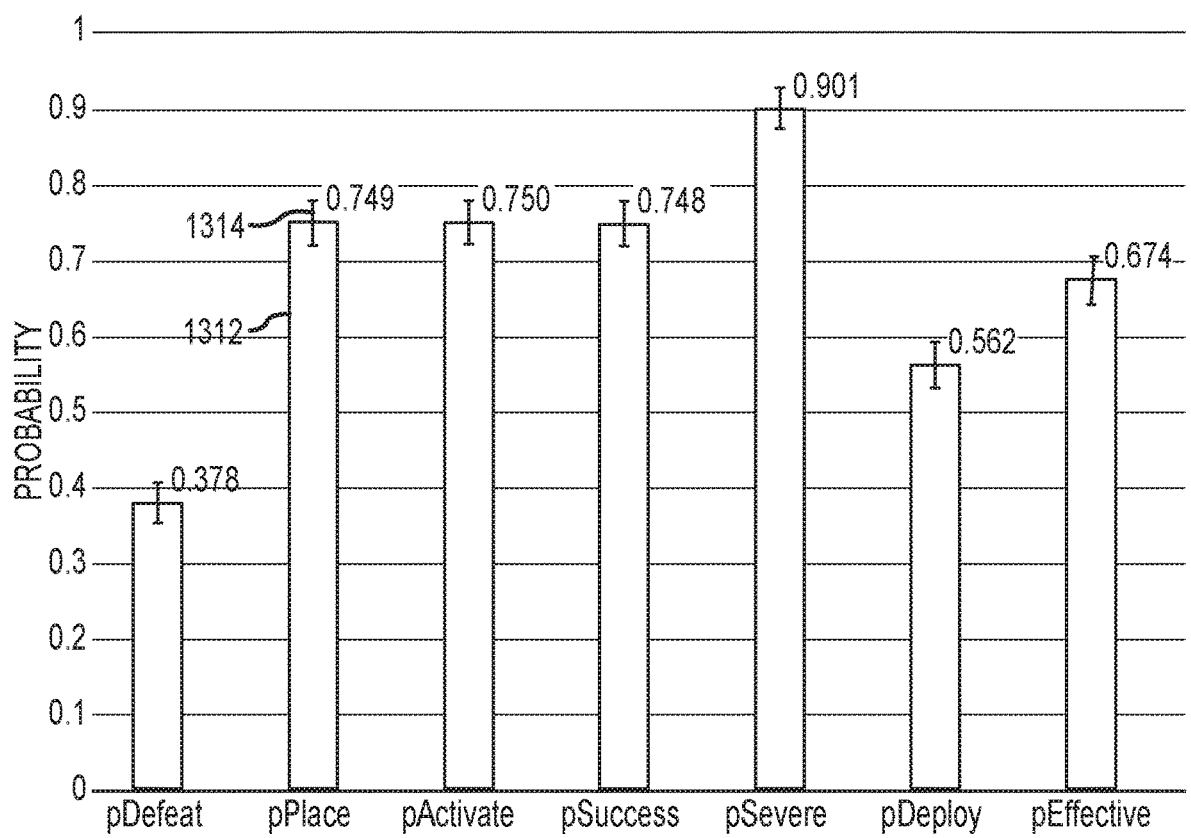

Referring again to the drawings, FIG. 12 is a table 1200 that displays the Pdefeat 1202 and confidence interval 1204 for each effect 1206 in the scenario synchronized to the stage 1208 and sub-stage 1210 of the threat kill chain. FIG. 13a is a bar graph 1300 of the probabilities 1302 and confidence intervals 1304 for each of the hierarchical parameters for the decomposed Pdefeat for the Denial of Service 1 cyber effect. FIG. 13b is a bar graph 1310 of the probabilities 1312 and confidence intervals 1314 for each of the hierarchical parameters for the decomposed Pdefeat for the Cyber GPS effect.

Figure 14A:
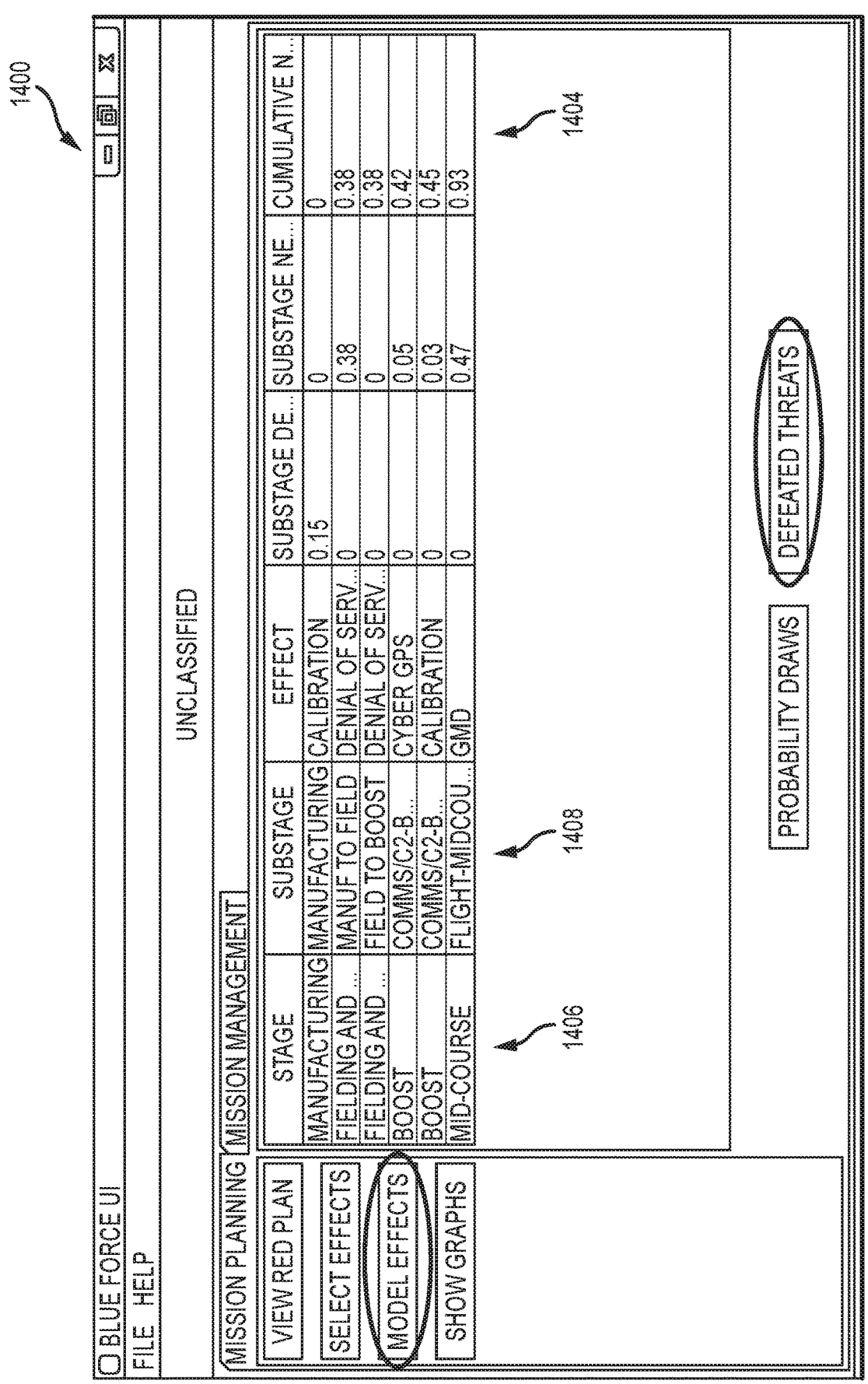
FIGS. 14a and 14b are a screen shot and bar graph of the cumulative Pdefeat, and corresponding confidence intervals, of the combined effects at each stage of the threat kill chain.
Figure 14B:
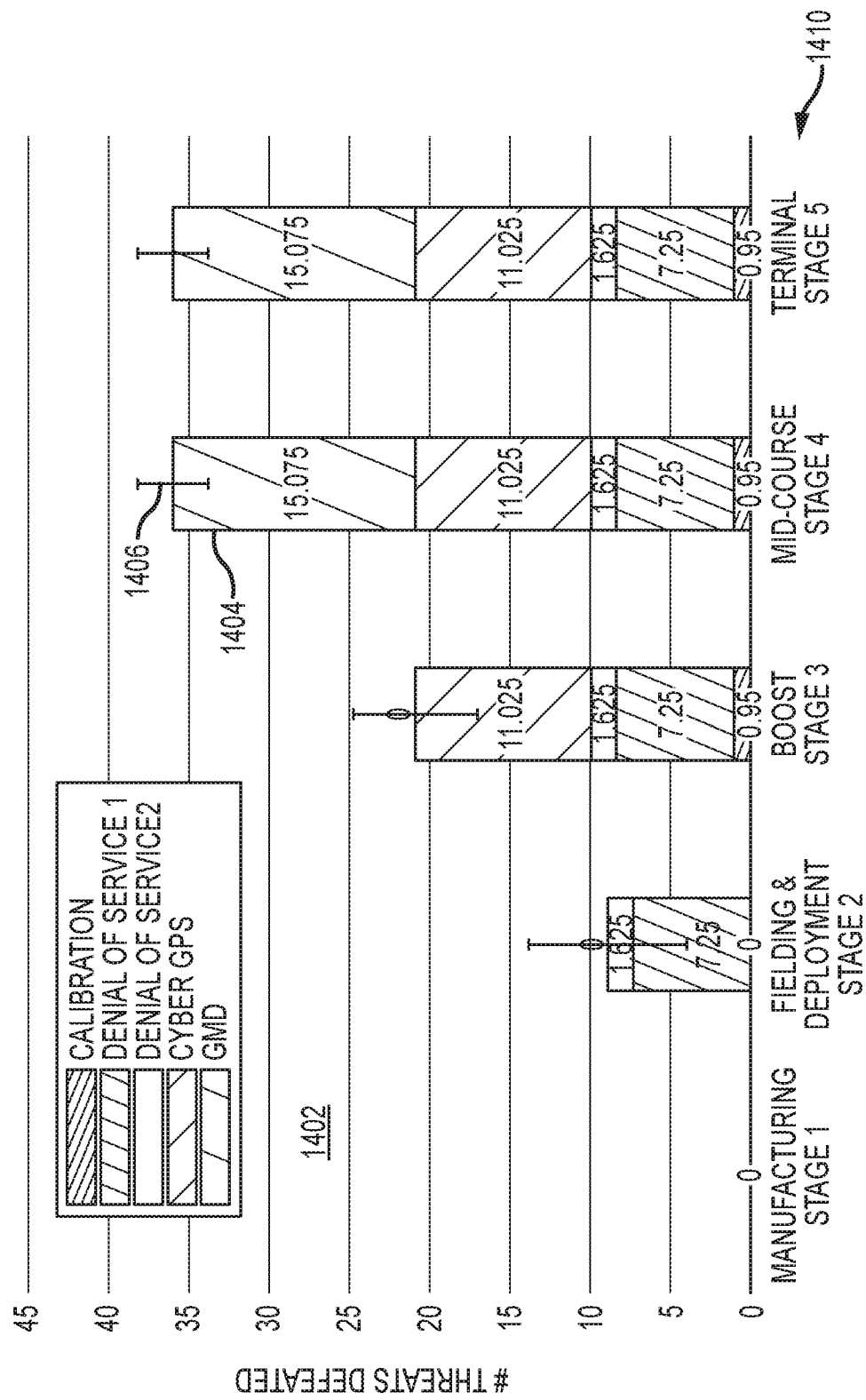

FIGS. 14a and 14b are a table 1400 and bar graph 1402 that display a cumulative Pdefeat 1404 and confidence interval 1406 for the combined kinetic and non-kinetic effects synchronized to the stage 1408 and sub-stage 1410 of the threat kill chain.

Figure 15:
FIG. 15 is a table illustrating the number of kinetic effects saved by the combined effects versus a single kinetic effect.

FIG. 15 is a table 1500 that displays a Pdefeat 1502 for each individual effect in a scenario and a cumulative Pdefeat 1504 for the combined effects against a threat including 40 ballistic missiles. Table 1500 also displays an average number of threats defeated prior to GMD launch 1506, average number of threats defeated 1508, number of GMD shots 1510 and the number of GMD shots saved 1512 (compared to a scenario of a single GMD shot). GMD shots are extremely expensive and deplete the available stockpile of GMDs for future threats. The table shows how the combined kinetic and non-kinetic effects scenario can increase the top-level Pdefeat, and defeat a threat prior to having to fire the GMD, thereby saving GMD shots. More generally, this table depicts how the current system and method can effectively plan a combined kinetic and non-kinetic response to a complex threat to more effectively negate the threat and do so in a more cost-effective manner.

Returning to FIG. 2c, up to this point, the system and method as described are used for offline planning to develop scenarios to defeat possible threats to build a library of scenarios, to build a library of rules-based models to both normalize inputs and normalize results data, to build effect-threat vulnerability information, to identify weak parameters.

In response to an active threat, a user or computer queries the library (step 230) to select one or more existing scenarios (step 224) developed for threats similar to the active threat. The system may compare metadata of the active threat to metadata for the existing scenarios and threats to select the existing scenario(s). Threat metadata may, for example, include type of ballistic missile, geolocation of launch facility, threat target). The scenario metadata may include the combination of kinetic and non-kinetic effects, and effectiveness of particular effects to defeat the threat at particular stages and sub-stages.

Depending on the nature of the active threat (e.g., a detected enemy missile launch or a deployment of a new type of enemy missile), the user and automated system have options. The closest existing scenario may be selected "as is" and distributed to the appropriate command and control for implementation. Another option is to synthesize a new scenario for the active threat from the closest selected scenarios using the metadata (step 232). The new scenario may combine portions of different existing scenarios to better address the active threat. If time allows, this new scenario may be rerun through the normalization, analysis tools and SMM (step 234) to compute the Pdefeat and confidence intervals for the scenario to validate the scenario, identify any weaknesses etc.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of analyzing kinetic and non-kinetic effects for negating kinetic and non-kinetic threats, the method comprising:
    defining a threat kill chain for one or more kinetic or non-kinetic threats;
    generating a scenario that combines kinetic and non-kinetic effects to engage the one or more kinetic or non-kinetic threats at different stages of the threat kill chain;
    normalizing input data for the one or more threats and the kinetic and non-kinetic effects to an input format ingestible by a stochastic math model (SMM);
    applying effect-specific analysis tools to one or more of the kinetic and non-kinetic effects in the scenario to individually negate one of the one or more threats and generate results data for each said effect-threat pair;
    normalizing the results data for each said effect to a set of hierarchical parameters ingestible by the SMM;
    iteratively running the SMM on the normalized input and results data to compute a probability of defeat (Pdefeat) with an associated confidence interval (CI) for each said effect and the combined effects at each stage of the threat kill chain; and
    displaying the Pdefeat and CIs for each said effect and the combined effects at each stage of the threat kill chain.

2. The method of claim 1, wherein the step of generating the scenario pairs each effect with a threat vulnerability in the threat kill chain.

3. The method of claim 1, further comprising evaluating one or more constraints selected from a policy on the use of effects, effect cost, effect availability and an effect technology readiness level (TRL) for the scenario.

4. The method of claim 3, further comprising using the one or more constraints to either pre-screen the scenario prior to running the SMM or to display the one or more constraints.

5. The method of claim 1, further comprising different scenarios for different threats, wherein a scenario is generated for an active threat by selecting multiple existing scenarios modeled for threats and synthesizing the selected scenarios based on metadata for the active threat and existing scenarios.

6. The method of claim 1, wherein the steps of normalizing the input data and the results data comprises applying a rules-based module to map the input data or results data to a delimited file format ingestible by the SMM.

7. The method of claim 1, wherein each parameter in the set of hierarchical parameters is represented as a probability with an associated confidence interval.

8. The method of claim 1, wherein a discrete event simulator (DES) is configured to implement the SMM and perform a Monte Carlo simulation on organically or synthetically varied input and results data to generate the Pdefeat and confidence intervals.

9. The method of claim 1, wherein the Pdefeat for the combined effects is given by Pdefeat=PE1+(1−PE1)*PE2|E1+(1−PE1)*(1−PE2)*PE3|E1, E2 . . . where PE1 is the probability of defeat of effect 1 against a stage of the kill chain, PE1|E1 is the conditional probability of defeat of effect 2 given effect 1 against a different stage of the kill chain.

10. The method of claim 1, wherein the Pdefeat for the combined effects is given by Pdefeat=Pdefeat,cyber+(1−Pdefeat,cyber)*Pdefeat,EW+(1−Pdefeatcyber)*(1−Pdefeat,EW)*Pdefeat kinetic where Pdefeat, cyber is the cumulative provability of defeat for all cyber effects, Pdefeat, EW is the cumulative probability of defeat for all electronic warfare effects and Pdefeat,kinetic is the cumulative probability of defeat for all kinetic effects against different stages of the kill chain.

11. The method of claim 1, wherein Pnegate=Psv|Psu)*(Psu|Pa)*(Pa|Ppl)*Ppl is the probability of defeating a threat for a cyber effect and where Ppl is the probability of placement of the cyber effect, Pa is the probability of activation of the cyber effect, Psu is the probability of success of the cyber effect and Psv is a probability indicating the extent of damage to the target that constitute the set of hierarchical parameters ingestible by the SMM.

12. The method of claim 1, further comprising injecting variability in the input and results data organically through variations in sensor inputs or simulated data.

13. The method of claim 1, further comprising injecting variability in the input and results data synthetically by introducing random numbers according to a probability distribution function.

14. The method of claim 4, further comprising feedback Battle Damage Assessment (BDA) data to the SMM to update effect/threat vulnerability, probabilities and constraints.

15. The method of claim 1, further comprising displaying the probabilities and confidence intervals for each hierarchical parameter for one or more effects.

16. The method of claim 12, further comprising identifying a parameter in the set of hierarchical parameters having the lowest probability or widest confidence interval as a weakest parameter.

17. The method of claim 1, further comprising generating scenarios at multiple security levels depending on the security classification of the input and results data.

18. A method of analyzing kinetic and non-kinetic effects for negating kinetic and non-kinetic threats, the method comprising:

defining a threat kill chain for one or more kinetic or non-kinetic threats;

generating a scenario that combines kinetic and non-kinetic effects to engage the one or more kinetic or non-kinetic threats at different stages of the threat kill chain;

applying effect-specific analysis tools to one or more of the kinetic and non-kinetic effects in the scenario to individually negate one of the one or more threats and generate results data for each said effect-threat pair;

normalizing the results data for each said effect to a set of hierarchical parameters ingestible by a stochastic math model (SMM);

iteratively running the SMM on the results data to compute a probability of defeat (Pdefeat) with an associated confidence interval (CI) for each said effect and the combined effects at each stage of the threat kill chain; and displaying the Pdefeat and CIs for each said effect and the combined effects at each stage of the threat kill chain.

19. The method of claim 18, wherein the steps of normalizing the results data comprises applying a rules-based module to map the results data to probabilities values for each parameter in the set of hierarchical parameters in a delimited file format ingestible by the SMM.

20. The method of claim 18, wherein a discrete event simulator (DES) is configured to implement the SMM and perform a Monte Carlo simulation on organically or synthetically varied input and results data to generate the Pdefeat and confidence intervals.

* * * * *